US011199856B2

(12) United States Patent
Katou et al.

(10) Patent No.: US 11,199,856 B2
(45) Date of Patent: Dec. 14, 2021

(54) SAFE OPERATION ASSISTANCE DEVICE, FLEET MANAGEMENT TERMINAL, AND SAFE OPERATION ASSISTANCE SYSTEM

(71) Applicant: HITACHI CONSTRUCTION MACHINERY CO., LTD., Tokyo (JP)

(72) Inventors: Seiya Katou, Tokyo (JP); Takeshi Ito, Tokyo (JP); Hiroshi Watanabe, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 273 days.

(21) Appl. No.: 16/334,964

(22) PCT Filed: Aug. 1, 2017

(86) PCT No.: PCT/JP2017/027866
§ 371 (c)(1),
(2) Date: Mar. 20, 2019

(87) PCT Pub. No.: WO2018/055920
PCT Pub. Date: Mar. 29, 2018

(65) Prior Publication Data
US 2019/0286161 A1    Sep. 19, 2019

(30) Foreign Application Priority Data
Sep. 23, 2016    (JP) ............................ JP2016-185573

(51) Int. Cl.
*G05D 1/02* (2020.01)
*H04W 4/46* (2018.01)
(Continued)

(52) U.S. Cl.
CPC ........... *G05D 1/0289* (2013.01); *B60R 21/00* (2013.01); *G01S 5/0072* (2013.01);
(Continued)

(58) Field of Classification Search
CPC .. G05D 1/0287; G05D 1/0289; G05D 1/0295; G05D 2201/0213;
(Continued)

(56) References Cited

U.S. PATENT DOCUMENTS 5,825,283 A * 10/1998 Camhi ................ B60R 25/102
340/438
6,393,362 B1 * 5/2002 Burns ................ G05D 1/0278
340/940
(Continued)

FOREIGN PATENT DOCUMENTS

| CN | 104050831 A | 9/2014 |
| JP | 2014-71839 A | 4/2014 |
| WO | 2007/020735 A1 | 2/2007 |

OTHER PUBLICATIONS

International Search Report for PCT/JP2017/027866 dated Oct. 31, 2017.
(Continued)

*Primary Examiner* — Thomas G Black
*Assistant Examiner* — Brandon Z Willis
(74) *Attorney, Agent, or Firm* — Mattingly & Malur, PC

(57) ABSTRACT

The safe operation assistance device 200 includes: a connecting destination detecting section 259 that detects and manages a connection state between the safe operation assistance device 200 and a connecting destination device; a unique information setting section 251 that sets unique information identifying a vehicle type of an own vehicle according to the connecting destination device; a positional information acquisition section 257 that acquires positional information of the own vehicle; an own vehicle information management section 252 that manages the positional information and the unique information of the own vehicle; an inter-vehicle communication section 255 that transmits the own vehicle information to other vehicle and acquires other
(Continued)

vehicle information; and a risk determination section 254 that determines presence or absence of a collision risk between the own vehicle and the other vehicle using the own vehicle information and the other vehicle information.

6 Claims, 9 Drawing Sheets

(51) Int. Cl.
  *G08G 1/16* (2006.01)
  *G08G 1/00* (2006.01)
  *G08G 1/09* (2006.01)
  *B60R 21/00* (2006.01)
  *G01S 5/00* (2006.01)

(52) U.S. Cl.
  CPC ............ *G05D 1/0295* (2013.01); *G08G 1/09* (2013.01); *G08G 1/16* (2013.01); *G08G 1/161* (2013.01); *G08G 1/22* (2013.01); *H04W 4/46* (2018.02); *G05D 2201/0213* (2013.01)

(58) Field of Classification Search
  CPC .. G05D 2201/021; H04W 4/46; H04W 4/025; H04W 4/029; G01S 5/0072; G01S 5/0009; G08G 1/16; G08G 1/09; G08G 1/161; G08G 1/162; G08G 1/163; G08G 1/166; G08G 1/207; G08G 1/22
  See application file for complete search history.

(56) References Cited

U.S. PATENT DOCUMENTS

| | | | |
|---|---|---|---|
| 8,255,144 B2 | 8/2012 | Breed et al. | |
| 8,779,934 B2 | 7/2014 | Rothacher et al. | |
| 9,697,733 B1* | 7/2017 | Penilla | G06Q 50/06 |
| 10,137,833 B2* | 11/2018 | Park | B60W 50/14 |
| 10,373,498 B2* | 8/2019 | Tanabe | H04L 67/12 |
| 2014/0277828 A1 | 9/2014 | Bullister et al. | |
| 2015/0100189 A1* | 4/2015 | Tellis | G08G 1/096791 |
| | | | 701/23 |
| 2016/0063864 A1* | 3/2016 | Ohsugi | B60W 50/14 |
| | | | 701/301 |

OTHER PUBLICATIONS

Chinese Office Action received in corresponding Chinese Application No. 201780025770.3 dated Dec. 31, 2020.

* cited by examiner

| TERMINAL IDENTIFIER | UNIQUE INFORMATION ||| POSITIONAL INFORMATION ||| TRAVELING INFORMATION || OP STATE | TIME OF RECEIPT | CONNECTION STATE |
| | VEHICLE IDENTIFIER | VEHICLE TYPE | VEHICLE SIZE | ADDITIONAL INFORMATION | LATITUDE | LONGITUDE | ELEVATION | VEHICLE SPEED | TRAVEL DIRECTION | ORIENTATION | | | |
|---|---|---|---|---|---|---|---|---|---|---|---|---|---|
| 200a | 110 | DUMP TRUCK | | | | | | | | | | | |

| TERMINAL IDENTIFIER | UNIQUE INFORMATION ||| POSITIONAL INFORMATION ||| TRAVELING INFORMATION || OP STATE | TIME OF RECEIPT | CONNECTION STATE |
| | VEHICLE IDENTIFIER | VEHICLE TYPE | VEHICLE SIZE | ADDITIONAL INFORMATION | LATITUDE | LONGITUDE | ELEVATION | VEHICLE SPEED | TRAVEL DIRECTION | ORIENTATION | | | |
|---|---|---|---|---|---|---|---|---|---|---|---|---|---|
| 200b | 120 | EXCAVATOR | | | | | | | | | | | |
| 200c | -- | GENERAL VEHICLE | | | | | | | | | | | |

SAFE OPERATION ASSISTANCE DEVICE, FLEET MANAGEMENT TERMINAL, AND SAFE OPERATION ASSISTANCE SYSTEM

TECHNICAL FIELD

The present invention relates to a safe driving assistance technology that prevents a rear-end collision and a collision of a vehicle.

BACKGROUND ART

Generally, in mines, construction sites and the like, large vehicles such as a dump truck are used. When a collision accident occurs between the large vehicles, in addition to the direct damage by the accident, the mining work in the mine and the construction work at the construction site are suspended, and big troubles occur in execution of the operation. Therefore, it is important to surely prevent the collision accident.

The dead angle of an operator operating these large vehicles is wide compared with ordinary automobiles. Therefore, such system and the like are mounted in order to detect other vehicles which may collide with the own vehicle using a sensor such as a radar and issue an alarm.

For example, there is such technology that the positional information of other vehicles is acquired by wireless communication, approaching of the other vehicles is detected, and an alarm is issued (refer to Patent Literature 1 for example). Thereby, such collision reduces that is caused by a vehicle approaching from a position hardly detected by a sensor because of the earth mound and the like and from the side. However, in the operation practice of a mine, there is also a work in which approaching is indispensable according to the vehicle type, and when it is determined only by the positional information, an alarm comes to be issued also in such case, and misinformation increases. In order to solve this, there is such technology for example that an operation management system for executing efficient mining of the ore is used, different risk region is set according to each vehicle to determine the collision risk, and an alarm is issued which takes the difference of the vehicle type of the counterpart vehicle and the difference of the risk caused by the difference of the location into consideration (refer to Patent Literature 2 for example).

CITATION LIST

Patent Literature

Patent Literature 1: U.S. Pat. No. 8,779,934
Patent Literature 2: U.S. Pat. No. 6,393,362

SUMMARY OF INVENTION

Technical Problem

However, when the collision risk is determined taking the difference of the vehicle type also into consideration, setting of the information of the vehicle type and the like is required for every vehicle on which a device for determining the risk is mounted, and it takes time and effort for the initial setting. Under a severe environment such as a mine, failures of devices are likely to occur, initial settings happen frequently, and a system taking time and effort for the initial setting is not user-friendly.

Also, according to an operation management system of a prior art, the information transmitted to a vehicle goes through a fleet management center, the fleet management center intervenes also in transmission of information between vehicles, and therefore it takes time for updating the information. Further, at a location where communication with the fleet management center is difficult, the information cannot be updated. Furthermore, at a working site of a mine and the like, not all vehicles are under control of the operation management system, and a light vehicle and the like for example conveying a workforce to an excavator is not under control of the operation management system and cannot use this system.

The present invention has been made in view of the circumstances described above, and its object is to provide a safe operation assistance device that effectively reduces a collision irrespective of an environment and a vehicle type.

Solution to Problem

The present invention provides a safe operation assistance device mounted on a vehicle, including a connecting destination detecting section that detects a connection state between the safe operation assistance device and a connecting destination device which is either a user interface or a fleet management terminal, the user interface being communicably connected to the safe operation assistance device and receiving operation of an operator, the fleet management terminal transmitting and receiving operation management information by communication with a fleet management center, and controls the connection state detected, a unique information setting section that sets unique information for identifying a vehicle type of an own vehicle according to the connecting destination device, the own vehicle being a vehicle on which the safe operation assistance device is mounted, a positional information acquisition section that acquires positional information of the own vehicle, an own vehicle information control section that controls own vehicle information including positional information of the own vehicle and the unique information, an inter-vehicle communication section that transmits positional information of the own vehicle and the unique information to an other vehicle and acquires other vehicle information including positional information of the other vehicle and the unique information of the other vehicle by communication with a safe operation assistance device that is mounted on the other vehicle, a risk determination section that determines whether a risk of collision exists between the own vehicle and the other vehicle using the own vehicle information and the other vehicle information, and an output section that outputs a determining result of the risk determination section.

Advantageous Effects of Invention

According to the present invention, a safe operation assistance device can be provided which effectively reduces a collision irrespective of the environment and the vehicle type. Also, problems, configurations, and effects other than those described above will be clarified by explanation of embodiments described below.

BRIEF DESCRIPTION OF DRAWINGS

FIG. 4A is an example of the communication format of the setting data, FIG. 4B is an example of the communication format of the operation data, FIG. 4C is an example of the communication format of the alarm data, and FIG. 4D is an example of the communication format of the inter-vehicle communication information respectively.

FIG. 5A is an explanatory drawing for explaining an example of the own vehicle information of an embodiment of the present invention, and FIG. 5B is an explanatory drawing for explaining an example of the other vehicle information of an embodiment of the present invention.

DESCRIPTION OF EMBODIMENTS

Figure 1:
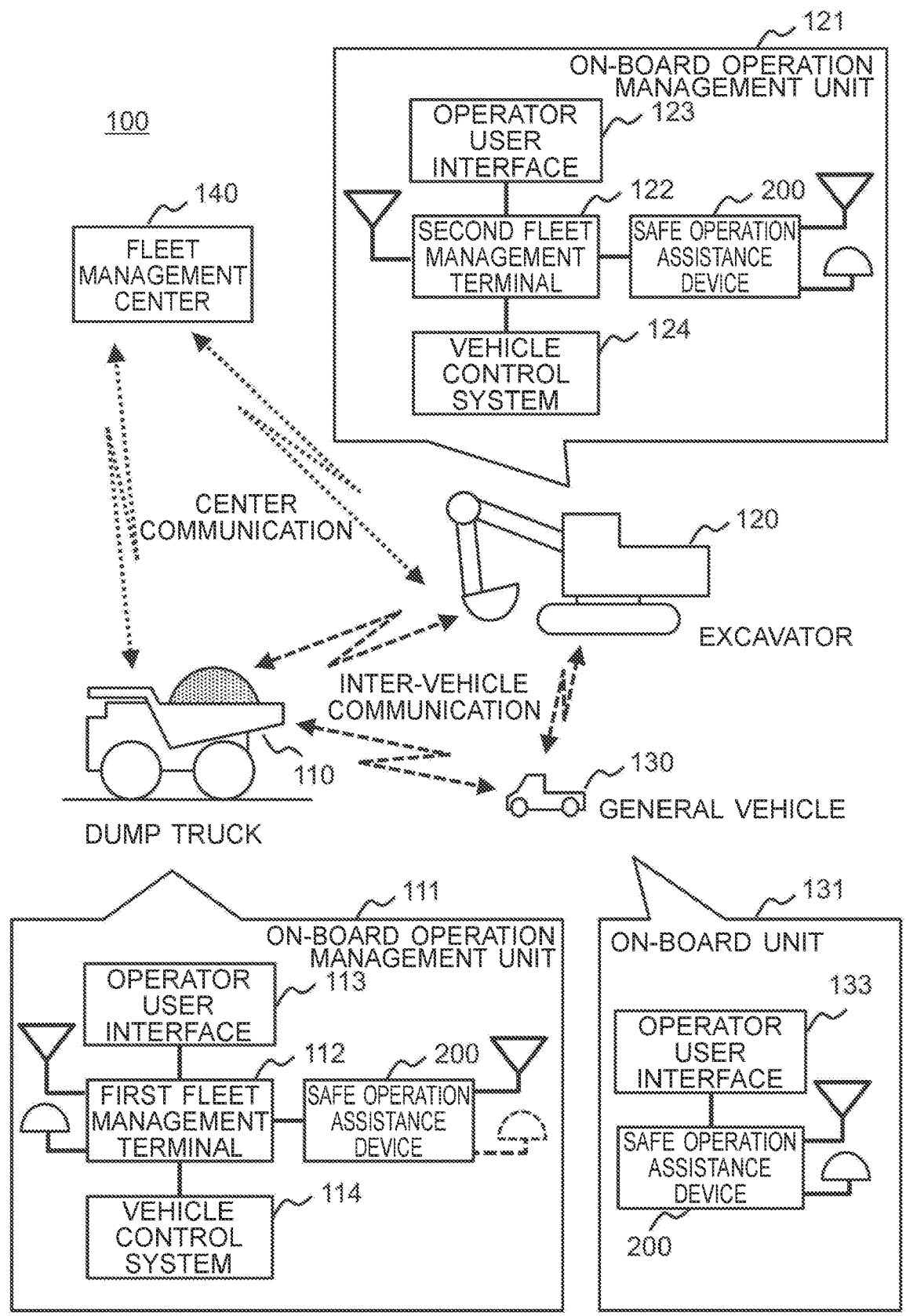
FIG. 1 is an explanatory drawing for explaining a configuration of a safe operation assistance system of an embodiment of the present invention.

Hereinafter, embodiments of the present invention will be explained in detail referring to the drawings. Also, in all drawings for explaining the present embodiments, those having the same function are marked with the same reference sign, and there is a case of omitting repeated explanation of them.

A first embodiment of the present invention will be explained. FIG. 1 is a drawing that shows a configuration of a safe operation assistance system 100 including a safety assistance device of the present embodiment. The safe operation assistance system 100 of the present embodiment includes on-board operation management units 111 and 121 mounted on vehicles 110 and 120 respectively, an on-board unit 131 mounted on a vehicle 130, and a fleet management center 140.

The vehicles 110, 120, 130 are vehicles used at a mine site and the like. The vehicles 110, 120 are heavy work machines whose operation is managed by the fleet management center 140, respectively. For example, the vehicle 110 is a dump truck, and the vehicle 120 is an excavator. Meanwhile, the vehicle 130 is not under control of the fleet management center 140, and is a general vehicle whose operation is not managed, for example a light vehicle that conveys manpower to an excavator.

Also, FIG. 1 shows an example of the safe operation assistance system 100 in which the on-board operation management units 111, 121 and the on-board unit 131 are mounted on three vehicles 110, 120, and 130, respectively. However, the safe operation assistance system 100 according to the present embodiment may be also configured so as to mount the on-board devices on vehicles of three or less or three or more respectively. Also, in the safe operation assistance system 100 according to the present embodiment, vehicles other than those shown in FIG. 1 such as a wheel loader and a grader for example may be included.

The on-board operation management unit 111 mounted on the vehicle 110 includes a first fleet management terminal 112, an operator user interface 113, and a vehicle control system 114. Also, the on-board operation management unit 121 mounted on the vehicle 120 includes a second fleet management terminal 122, an operator user interface 123, and a vehicle control system 124.

The on-board unit 131 mounted on the vehicle 130 includes an operator user interface 133. Also, the vehicle 130 does not include a fleet management terminal and a vehicle control system because the vehicle 130 is not managed by the fleet management center 140.

Furthermore, each of the on-board operation management units 111, 121 and the on-board unit 131 further includes a common safe operation assistance device 200, respectively.

In each of the on-board operation management units 111, 121 and the on-board unit 131, the safe operation assistance device 200 is communicably connected to the first fleet management terminal 112, the second fleet management terminal 122, and the operator user interface 133 respectively. Also, using vehicle information including positional information of a vehicle on which the safe operation assistance device 200 is mounted (will be hereinafter referred to as an own vehicle) and vehicle information including positional information of an other vehicle around the own vehicle (will be hereinafter referred to as another vehicle), the safe operation assistance device 200 determines the risk of collision of the own vehicle and the other vehicle, and outputs alarm information in order to give an operator an alarm.

The first fleet management terminal 112 and the second fleet management terminal 122 execute wireless communication between the fleet management center 140, and thereby notify the fleet management center 140 of the state of the own vehicle at a predetermined time interval. Also, the first fleet management terminal 112 and the second fleet management terminal 122 receive the instruction and information transmitted from the fleet management center 140. The first fleet management terminal 112 and the second fleet management terminal 122 generate a control signal from the received instruction, and output the control signal to the vehicle control systems 114 and 124, respectively.

Also, the first fleet management terminal 112 and the second fleet management terminal 122 of the present embodiment store information of the own vehicle unique to the vehicle (unique information) and information on the operation state (operation information) in the inside. Further, such information is outputted to the safe operation assistance device 200 according to the necessity.

Also, the first fleet management terminal 112 of the vehicle 110 and the second fleet management terminal 122 of the vehicle 120 have a basically same configuration with respect to a portion according to the present embodiment. Therefore, below, in the present description, the first fleet management terminal 112 and the second fleet management terminal 122 are referred to as the fleet management terminal 112 and are explained representatively unless there is any need of distinguishing them in particular.

The operator user interfaces 113, 123, 133 of the present embodiment present the alarm information outputted from the safe operation assistance device 200 to the operator of the own vehicle. The alarm information is, for example, information on the other vehicle that has a risk of colliding with the own vehicle and information on the risk of the collision with the other vehicle in question. Presentation to the user is executed by ringing a buzzer, lighting a lamp, and displaying an alarm screen for example.

Also, the operator user interfaces 113, 123 receive the alarm information through the fleet management terminal 112. The operator user interfaces 113, 123 may be a display and a voice output device for example. Also, the operator user interfaces 113, 123 may be a general-purpose information processing device, a tablet terminal, and the like, the general-purpose information processing device being furnished with a display, an input device, a voice output device, a calculation device (CPU), a storage device, a memory, and the like.

Further, the operator user interfaces 113 and 123 have a basically similar configuration. Hereinafter, in the present description, the operator user interfaces 113 and 123 are represented by the operator user interface 113 unless there is any need of distinguishing in particular. Also, below, in the present description, the operator user interface 113 will be explained exemplifying a case of being a display.

Further, the operator user interface 133 of the vehicle 130 is a general-purpose information processing device, a tablet terminal, and the like, the general-purpose information processing device being furnished with a display, an input device, a voice output device, a calculation device (CPU), a storage device, a memory, an external device connection interface and the like. The operator user interface 133 only has to have a configuration of being capable of presenting the information inputted through the external device connection interface to the user.

The vehicle control systems 114, 124 control the brake, steering, and the like of the own vehicle according to the control signal from the fleet management terminal 112, and execute traveling control of the own vehicle. The vehicle control systems 114, 124 have a basically same configuration. Hereinafter, in the present description, the vehicle control systems 114, 124 are represented by the vehicle control system 114 unless there is any need of distinguishing in particular.

Respective devices described above mounted on the respective on-board operation management units 111, 121 and the on-board unit 131 are connected to each other through a network or connected individually within the respective on-board operation management units 111, 121 and the on-board unit 131.

Hardware Configuration

Next, a hardware configuration of the safe operation assistance device 200 and the fleet management terminal 112 of the present embodiment will be explained.

Safe Operation Assistance Device

Figure 2A:
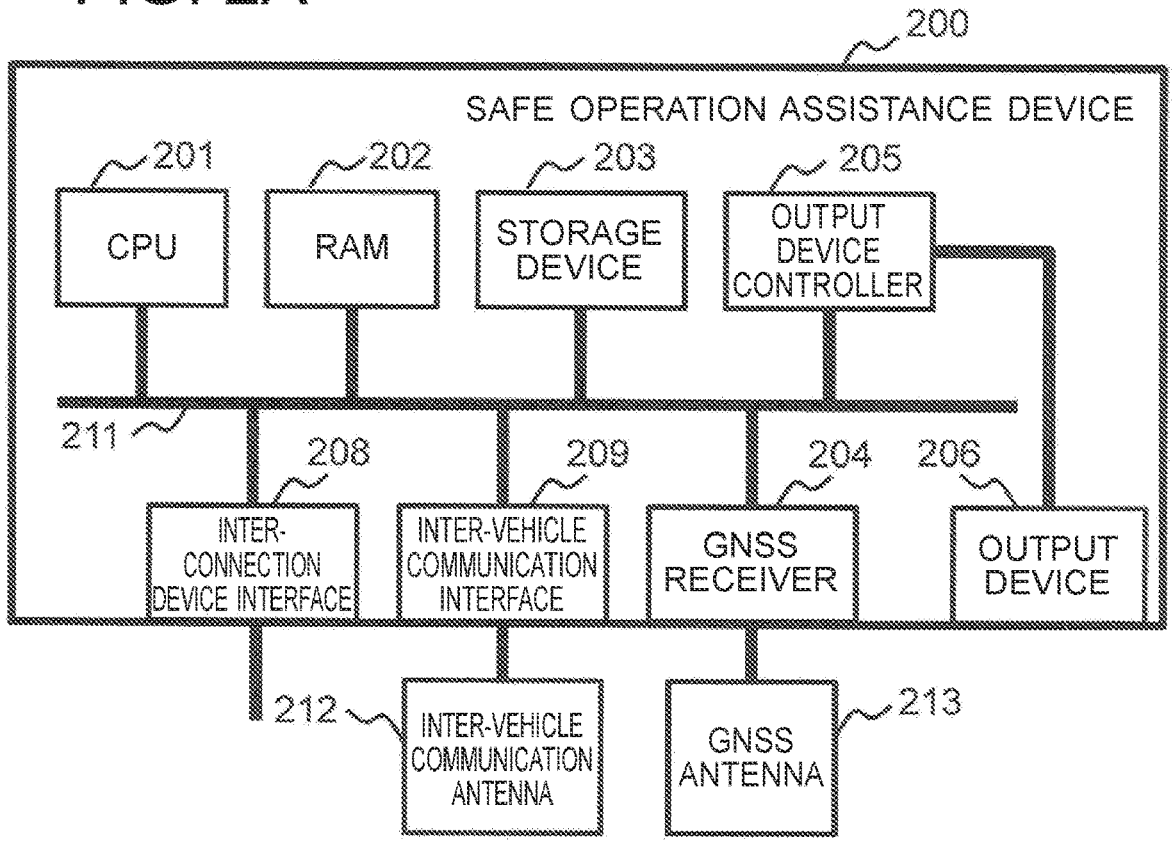
FIG. 2A is a hardware configuration diagram of a safe operation assistance device of an embodiment of the present invention.

FIG. 2A is a hardware configuration diagram of the safe operation assistance device 200 of the present embodiment. As shown in the present diagram, the safe operation assistance device 200 includes a CPU 201, a volatile memory (will be hereinafter referred to simply as a memory) 202 such as a RAM, a storage device 203 that is a non-volatile storage such as a ROM, a FLASH memory, and a hard disk, an output device 206, an output device controller 205, an inter-connection device interface 208, an inter-vehicle communication interface 209, a GNSS (Global Navigation Satellite System) receiver 204, and an internal bus 211 that connects them to each other.

To the inter-vehicle communication interface 209, an inter-vehicle communication antenna 212 is connected, the inter-vehicle communication antenna 212 being for transmitting and receiving the data by the inter-vehicle (vehicle-to-vehicle) communication. To the GNSS receiver 204, a GNSS antenna 213 for acquiring the GNSS data is connected. Also, when the safe operation assistance device 200 is connected to the fleet management terminal 112, the GNSS antenna 213 may be shared by the both. Also, when the fleet management terminal 112 is connected, it is possible that the GNSS antenna 213 is not connected to the safe operation assistance device 200 and the positional information of the own vehicle is received from the fleet management terminal 112. Further, as the GNSS, the Global Positioning System (GPS), GLONASS, and the like can be cited.

The inter-connection device interface 208 is an interface for connecting the safe operation assistance device 200 to the fleet management terminal 112 or the operator user interface 133. The safe operation assistance device 200 and the fleet management terminal 112 or the operator user interface 133 are communicably connected to each other by Ethernet (registered trademark), CAN (Controller Area Network), Bluetooth (registered trademark), and the like for example. Hereinafter, in the present description, communicable connection between the safe operation assistance device 200 and the fleet management terminal 112 or the operator user interface 133 is referred to simply as connection irrespective of wired or wireless.

The output device 206 is an output interface of the processing result within the safe operation assistance device 200 to the operator. In the present embodiment, for example, when the risk determination and the like described below is executed and it is determined that there is a risk, an alarm is outputted to the operator. Therefore, for the output device 206, an indicator such as a lamp, a simple display device, a buzzer, a simple voice output device for example is used. The output device controller 205 controls the operation of the output device 206.

Fleet Management Terminal

Figure 2B:
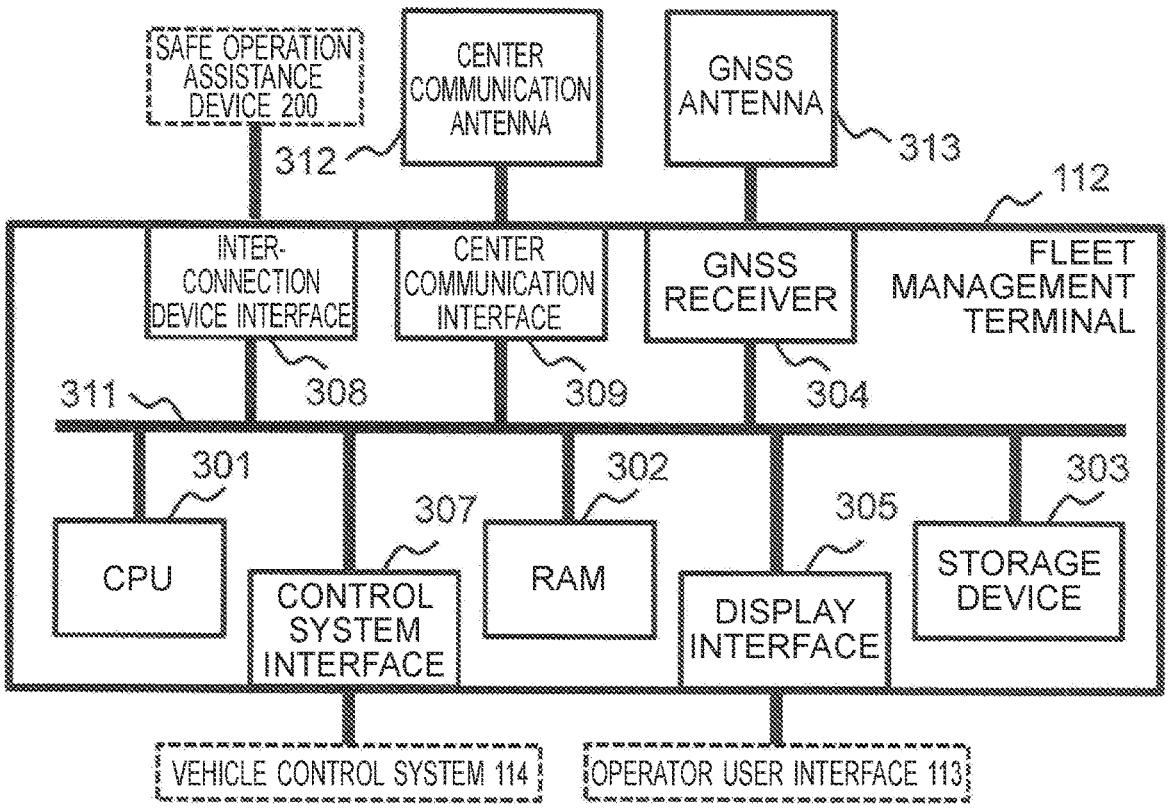
FIG. 2B is a hardware configuration diagram of a fleet management terminal of an embodiment of the present invention.

FIG. 2B is a hardware configuration diagram of the fleet management terminal 112 of the present embodiment. As shown in the present diagram, the fleet management terminal 112 includes a CPU 301, a volatile memory (will be hereinafter referred to simply as a memory) 302 such as a RAM, a storage device 303 that is a non-volatile storage such as a ROM, a FLASH memory, and a hard disk, a display interface 305, a control system interface 307, an inter-connection device interface 308, a center communication interface 309, a GNSS receiver 304, and an internal bus 311 that connects them to each other.

To the center communication interface 309, a center communication antenna 312 for communicating with the fleet management center 140 is connected. To the GNSS receiver 304, a GNSS antenna 313 is connected. The inter-connection device interface 308 is a connection interface with the safe operation assistance device 200.

The control system interface 307 is an interface that connects to the vehicle control system 114 through the on-board network. For the on-board network, CAN, the on-board Ethernet, and the like are used.

The display interface 305 is connected to the operator user interface 113 through a display cable for example. For the display cable, an RGB cable, an HDMI (registered trademark) cable, and the like for example are used.

Also, in the present embodiment, the positional information of the own vehicle acquired using the GNSS can be acquired directly on the side of the safe operation assistance device 200, and therefore the fleet management terminal 112 is not required to have an own vehicle positional information acquisition function configured of the GNSS receiver 302 and the GNSS antenna 313. Further, presence or absence of the own vehicle positional information acquisition function or the attaching configuration of the GNSS antenna 313 may be different for every vehicle.

Function Block

Next, the function of the safe operation assistance device 200 and the fleet management terminal 112 achieving the safe operation assistance system 100 of the present embodiment will be explained.

Safe Operation Assistance Device

The safe operation assistance device 200 of the present embodiment is mounted on a vehicle operated in a mine and the like, detects the distance to the other vehicle by the inter-vehicle communication, and determines the collision risk depending on the vehicle type. At this time, the safe operation assistance device 200 functions irrespective of the vehicle on which the safe operation assistance device 200 is mounted namely irrespective of the kind of the device of the connecting destination. Also, at the time of the connection, setting of the information of the vehicle of the mounting destination such as the vehicle type and the like by the user is not required. Further, even when the connection with the device of the connecting destination is interrupted, the information unique to the vehicle having been set at the time of the last connection can be utilized as it is, and another initial setting process is not required also.

Figure 3A:
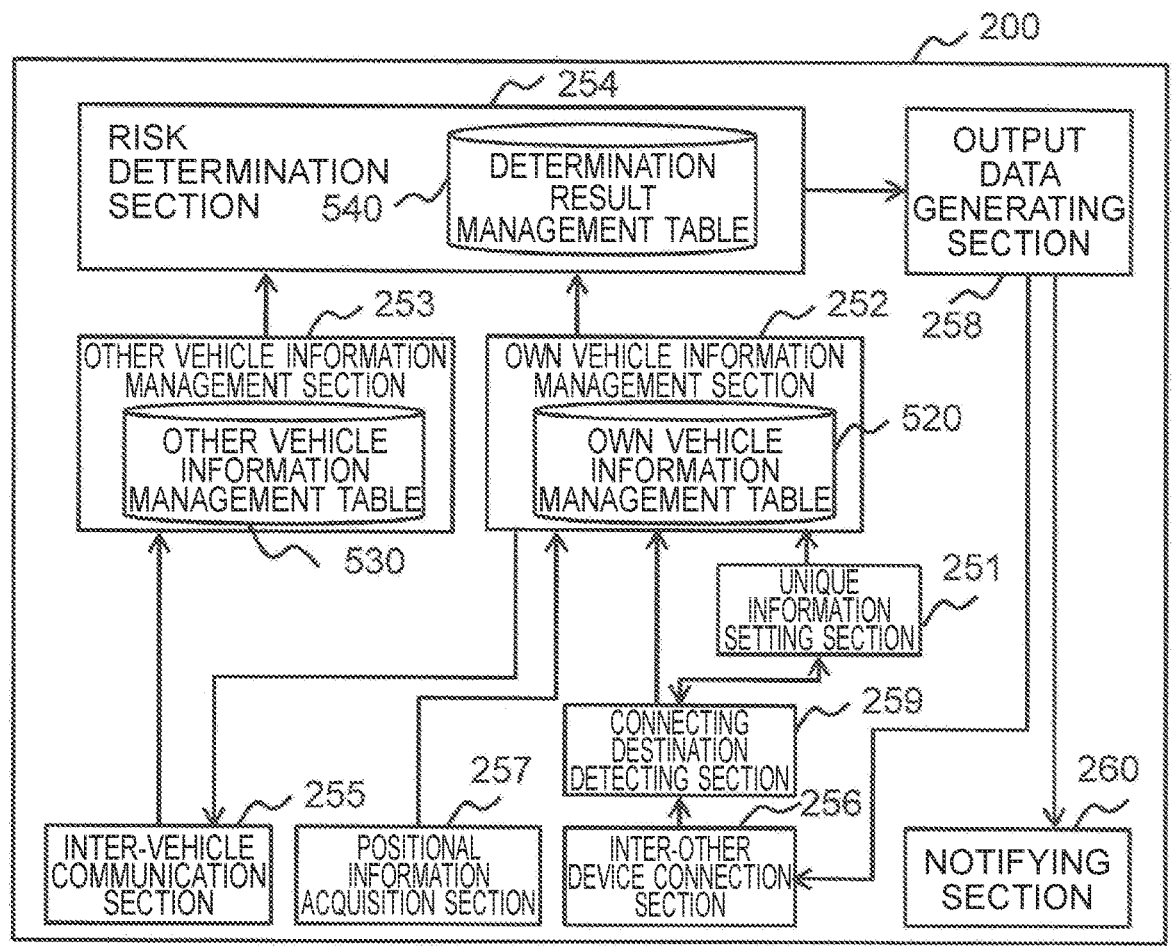
FIG. 3A is a functional block diagram of a safe operation assistance device of an embodiment of the present invention.

A function of the safe operation assistance device 200 of the present embodiment achieving the above will be explained. FIG. 3A is a functional block diagram of the safe operation assistance device 200 of the present embodiment. As shown in the present diagram, the safe operation assistance device 200 of the present embodiment includes a unique information setting section 251, an own vehicle information management section 252, an other vehicle information management section 253, a risk determination section 254, an inter-vehicle communication section 255, an inter-other device connection section 256, a positional information acquisition section 257, an output data generating section 258, a connecting destination detecting section 259, and a notifying section 260.

Inter-Other Device Connection Section

The inter-other device connection section 256 detects presence or absence of connection of the external device to the inter-connection device interface 208, and, upon detection of the connection, executes transmitting and receiving of the data between the external device (connecting destination device) in question. Also, the inter-other device connection section 256 detects connection and interruption with the connecting destination device, and notifies the connecting destination detecting section 259 of the connection notification and the interruption notification for example respectively.

In the present embodiment, the connecting destination device is either the fleet management terminal 112 or the operator user interface 133. For example, when the connecting destination device is the fleet management terminal 112, the inter-other device connection section 256 receives the data (receiving data) from the fleet management terminal 112. The receiving data includes setting data including the unique information that is information identifying the own vehicle and operation data including information that shows the operation state, the positional information, and the traveling information of the own vehicle. The detail of the receiving data will be described below. The inter-other device connection section 256 transmits the data received to the connecting destination detecting section 259. Also, the operation state will be described below.

Also, the inter-other device connection section 256 outputs alarm data formed from the determination result by the risk determination section 254 to the connecting destination device. The detail of the alarm data will be also described below.

Connecting Destination Detecting Section

The connecting destination detecting section 259 manages the connection state of the safe operation assistance device 200 with respect to the external device, and detects and manages the connecting destination device of the connected case.

The connecting destination detecting section 259 monitors the connection state at a predetermined time interval after the start-up, and determines whether the connection state is any of "0: not yet connected", "1: waiting for connection", "2: connection established", or "3: interrupted after connection" for example. A determination is made based on the connection notification and interruption notification received from the inter-other device connection section 256, and the data. Furthermore, the determination result is registered on an own vehicle information management table 520 described below.

"0: not yet connected" is a state where the safe operation assistance device 200 is not connected to any external device. That is to say, it is a state where the inter-other device connection section 256 does not receive regular connection confirmation information through the inter-connection device interface 208. For example, when the connecting destination device cannot be detected even when a certain time elapses after the startup, the connecting destination detecting section 259 determines that there is no connecting destination device, and determines to be a not-yet-connected state which is a state where detection of the connecting destination device in question is not executed.

"1: waiting for connection" is a state after the start-up of the safe operation assistance device 200 and until the safe operation assistance device 200 is connected. For example, "1: waiting for connection" is a state where the safe operation assistance device 200 is connected to an external device and start-up of the external device side is waited for. During the state of waiting for the connection, the connecting destination detecting section 259 executes detection of the connecting destination device.

"2: connection established" is a state of having been connected and executing transmitting and receiving of the data. Also, "2: connection established" is a state where the interruption notification has not been received after having received the connection notification from the inter-other device connection section 256. That is to say, "2: connection established" is a state where the connecting destination device has been detected and connection with the connecting destination device in question has been maintained. At this time, when the connecting destination device is the fleet management terminal 112, the receiving data described above are received further.

"3: interrupted after connection" is a state of having been interrupted after going through the connected state. The present state is a state where the connecting destination has been detected but the connection has been interrupted. The interruption notification is received from the inter-other device connection section 256, and it becomes the present state.

Also, the connecting destination detecting section 259 detects the connecting destination device of the safe operation assistance device 200 based on the detected connection state and the data received by the inter-other device connection section 256. In the present embodiment, it is determined to which of, for example, "connected to the fleet management terminal 112", "connected to the operator user interface 133", or "used solely without being connected to any device" the connecting destination device is applicable.

For example, when the connection state is "1: waiting for connection", the connection confirmation information is not received for a predetermined period, and the connection state transits to "0: not yet connected", it is determined to be "used solely". Also, when the connection state is "2: connection established" and the inter-other device connection section 256 has received the setting data 410 described above, it is determined to be "connected to the fleet management terminal 112". Meanwhile, when the setting data 410 are not received through the inter-other device connection section 256 although the connection state is "2: connection established", it is determined to be "connected to the operator user interface 133".

The connecting destination detecting section 259 of the present embodiment notifies the unique information setting section 251 of the detection result. Also, when the connecting destination device is detected to be the fleet management terminal 112, the setting data received from the fleet management terminal 112 are also transmitted to the unique information setting section 251. Further, the information showing the operation state and the operation data are transmitted to the own vehicle information management section 252.

Also, at the time of the maintenance process and the like, there is a case that the safe operation assistance device 200 is temporarily attached to the on-board system and it is not preferable to keep the unique information. It may be configured for example that a maintenance mode and the like is arranged, and that, when the maintenance mode is selected, the setting data received from the fleet management terminal 112 are not transmitted to the unique information setting section 251.

Also, it may be configured that, when the connecting destination device is the fleet management terminal 112, connection and interruption are monitored using the operation data transmitted regularly.

Unique Information Setting Section

The unique information setting section 251 sets and keeps the unique information depending on the connecting destination device received from the connecting destination detecting section 259, and transmits the unique information to the own vehicle information management section 252.

When the connecting destination device is the fleet management terminal 112, the unique information to be set is acquired from the setting data received from the connecting destination detecting section 259. That is to say, when the connecting destination detecting section 259 detects the fleet management terminal 112 as the connecting destination device, the unique information setting section 251 sets the setting data transmitted from the fleet management terminal 112 as the unique information. Meanwhile, when the connecting destination device is the operator user interface 133 or when the safe operation assistance device 200 is used solely, a default value is set as the unique information. That is to say, when no device has been connected or when the connecting destination detecting section 259 detects the operator user interface 133 as the connecting destination device, the default value is set as the unique information.

The default value is information showing that the vehicle mounting the safe operation assistance device 200 is a vehicle other than the heavy work machine that is under control of the operation management system or that the safe operation assistance device 200 is used solely. For example, out of the unique information, with respect to the vehicle type, the information showing to be a general vehicle is made the default value, with respect to the vehicle size, the average size of the general vehicle is made the default value, with respect to the vehicle identifier, the terminal identifier given to the safe operation assistance device 200 described below is made the default value, and so on. The default values are prepared beforehand, and are kept in the storage device 203.

Also, the unique information setting section 251 of the present embodiment may be configured so that the latest unique information managed by the own vehicle information management section 252 is stored by a request from the own vehicle information management section 252 described below.

Positional Information Acquisition Section

The positional information acquisition section 257 acquires the positional information of a vehicle of the mounting destination. In the present embodiment, the positional information, the traveling information, and the like of the own vehicle are acquired based on the GNSS signal received by the GNSS receiver 204 through the GNSS antenna 213, and are outputted to the own vehicle information management section 252 at every acquisition.

Own Vehicle Information Management Section

The own vehicle information management section 252 manages the own vehicle information. The own vehicle information is managed in the own vehicle information management table 520. Information managed as the own vehicle information includes the unique information, positional information, traveling information, working information, time of receipt, and connection state for example. The detail of the own vehicle information will be described below.

Further, out of the information managed as the own vehicle information, information changing over time is overwritten with every information receipt. Moreover, when the positional information of the own vehicle is not received for a certain time or more, the own vehicle information management section 252 clears (resets) the data stored in the own vehicle information management table 520.

Further, when the positional information and the traveling information can be acquired from both, the positional information acquisition section 257 and the fleet management terminal 112, respectively, the own vehicle information management section 252 determines which information is to be utilized, and stores only the information received from the one having been determined in the own vehicle information management table 520. A method for determining which information is to be utilized includes, for example, to employ the information whose updating frequency of the acquired positional information is higher, to employ the information with less error, to set the order of priority beforehand and to select which information is to be utilized according to the order of priority, and so on.

Also, according to a request, the own vehicle information management section 252 of the present embodiment presents the own vehicle information to the inter-vehicle communication section 255 and the risk determination section 254, respectively.

Inter-Vehicle Communication Section

The inter-vehicle communication section 255 executes inter-vehicle communication between the other safe operation assistance device 200. The inter-vehicle communication is the direct wireless communication not going through a relay station.

The inter-vehicle communication section 255 regularly acquires data from the own vehicle information management table 520, generates inter-vehicle communication information including information on the own vehicle, and transmits the inter-vehicle communication information to other vehicles. Also, the inter-vehicle communication section 255 receives inter-vehicle communication information formed regularly by other vehicle and including information on the other vehicle in question, and transmits the inter-vehicle communication information to the other vehicle information management section 253. Transmitting and receiving are executed through the inter-vehicle communication interface 209.

As the wireless communication method, other than the Ad-Hoc mode, 801.11p, and the like of WiFi, a communication method using one's own peculiar frequency band commonly within a mine can be also used.

The data formed as the inter-vehicle communication information and transmitted and received include the unique information, the traveling data, the connection state, and the like for example. The detail of the inter-vehicle communication information will be described below.

Other Vehicle Information Management Section

The other vehicle information management section 253 stores the inter-vehicle communication information received from the other vehicle by the inter-vehicle communication section 255 in an other vehicle information management table 530 as information of the other vehicle. Data stored in the other vehicle information management table 530 (other vehicle information) are basically the same as the own vehicle information. However, the data are stored as one record for every vehicle.

Also, the other vehicle information management section 253 receives the inter-vehicle communication information regularly. When new inter-vehicle communication information is received, based on a terminal identifier or a vehicle identifier of the unique information, a record having the same identifier is updated to the latest record. When there is no record having the same identifier, the new inter-vehicle communication information is stored as a new record. Also, a record having an identifier that does not receive the inter-vehicle communication information for a certain time or more is deleted from the other vehicle information management table 530.

Risk Determination Section

The risk determination section 254 determines the risk of collision with the other vehicle using the own vehicle information managed by the own vehicle information management section 252 and the other vehicle information managed by the other vehicle information management section 253. Determination of the risk is executed at predetermined timing for example regularly, or when a predetermined event occurs.

In the present embodiment, determination of the risk is executed with respect to all other vehicles stored in the other vehicle information management table 530. The determination result is stored in a determination result management table 540. For example, with respect to an other vehicle determined to have a risk of collision, information (with risk) that means to have the collision risk is stored corresponding to the other vehicle in question, and with respect to the other vehicle determined to have no risk of collision, information (without risk) that means to have no collision risk is stored. The determination and storage are executed at predetermined timing. For example, the determination and storage are executed at a predetermined time interval. When determination finishes with respect to all other vehicles, the output data generating section 258 is notified of that effect.

In the present embodiment, the risk determination section 254 determines that there is a collision risk when the relative distance to the other vehicle becomes a certain distance or less for example. Also, in determination of the risk, not only the positional relation of the own vehicle and the other vehicle but also the combination of the vehicle type and the operation state of each vehicle set in the own vehicle information and the other vehicle information are taken into account. In this case, the determination method and the value of the parameter used in determination are changed according to the combination and the operation state for example.

Also, the operation state means information showing the working state of the own vehicle. The operation state is determined beforehand for each vehicle type, and is set by the fleet management terminal 112. For example, when the vehicle type is a dump truck, the operation state is "loading", "waiting", "hauling", "dumping", "others", and the like. When the vehicle type is an excavator or a wheel loader, the operation state is "loading", "others", and the like. Also, when the vehicle type is a dozer or a grader, the operation state is "leveling", "others", and the like.

For example, it is possible to arrange a degree of priority in the operation state of a vehicle, and to change the distance with which it is determined that there is a collision risk (threshold distance) according to the degree of priority. In a vehicle whose operation state has higher degree of priority, the threshold distance is made shorter. For example, when the own vehicle is in the operation state of high degree of priority, because the threshold distance becomes short, possibility of being determined to have a collision risk becomes low, and the work is not hindered. Meanwhile, with respect to a vehicle in the operation state of low degree of priority, since the threshold distance becomes long, it is determined to have a collision risk from the early stage.

Also, the threshold distance may be changed according to the vehicle type and the working content. For example, in a case of a dump truck and an excavator, when a loading work and the like are executed, proximate work becomes necessary. The algorithm of the risk determination including the threshold distance and the like is determined so that such case is not determined to have a collision risk.

Output Data Generating Section

When a notification of finish of determination is received from the risk determination section 254, the output data generating section 258 generates output data addressed to the connecting destination device. For the output data, out of all other vehicles having been determined, with respect to the other vehicles having been determined to have a collision risk, alarm information is stored, whereas with respect to the other vehicles having been determined not to have a collision risk, nothing is stored. The output data are formed using data stored in the determination result management table 540. Also, in generating the output data, the output data generating section 258 also refers to the own vehicle information management table 520 and the other vehicle information management table 530.

The output data having been formed are transmitted to the inter-other device connection section 256, are made alarm data by the inter-other device connection section 256, and are outputted to the connecting destination device. The detail of the alarm data will be described below.

Also, the output data generating section 258 of the present embodiment generates notifying data as well which are outputted from the notifying section 260 of the safe operation assistance device 200. Thereby, the operator can grasp the risk condition even when the safe operation assistance device 200 is used solely.

Also, the output data generating section 258 generates the output data only when the safe operation assistance device 200 is connected to any of the connecting destination devices. Whether or not the output data are to be formed is determined using the connection state of the own vehicle information. For example, when the connection state is "0: not yet connected", "1: waiting for connection", or "3: interrupted after connection", the output data are not formed. Also, the notifying data are formed only when there is the other vehicle having been determined to have a collision risk.

Notifying Section

When the notifying data are received from the output data generating section 258, the notifying section 260 outputs an alarm. In the present embodiment, the output device controller 205 realizes this function. For example, when the output device 206 is a lamp or a simple display device, its lighting pattern is changed. Also, when the output device 206 is a buzzer, an alarm sound is outputted from the buzzer.

Respective functions described above of the safe operation assistance device 200 are achieved by that the CPU 201 loads the program stored beforehand in the ROM and the like of the storage device 203 to the memory 202 and executes the program. Also, all or a part of the function may be achieved by hardware such as ASIC (Application Specific Integrated Circuit), FPGA (field-programmable gate array).

Also, various kinds of data used for processing of each function and various kinds of data formed during processing are stored in the memory 202 or the storage device 203. Further, the own vehicle information management table 520, the other vehicle information management table 530, and the determination result management table 540 are constructed in the memory 202 or the storage device 203. Meanwhile, the unique information kept by the unique information setting section 251 is stored in the storage device 203.

Also, in the safe operation assistance device 200, it may be configured, for example, that processing of wireless transmitting and receiving by the inter-vehicle communication section 255 and processing of risk determination by the risk determination section 254 are executed in separate threads. Thereby, even when the load of the risk determination processing is large, the transmission period of the inter-vehicle communication is not affected and transmission can be continued at a predetermined period.

Fleet Management Terminal

Figure 3B:
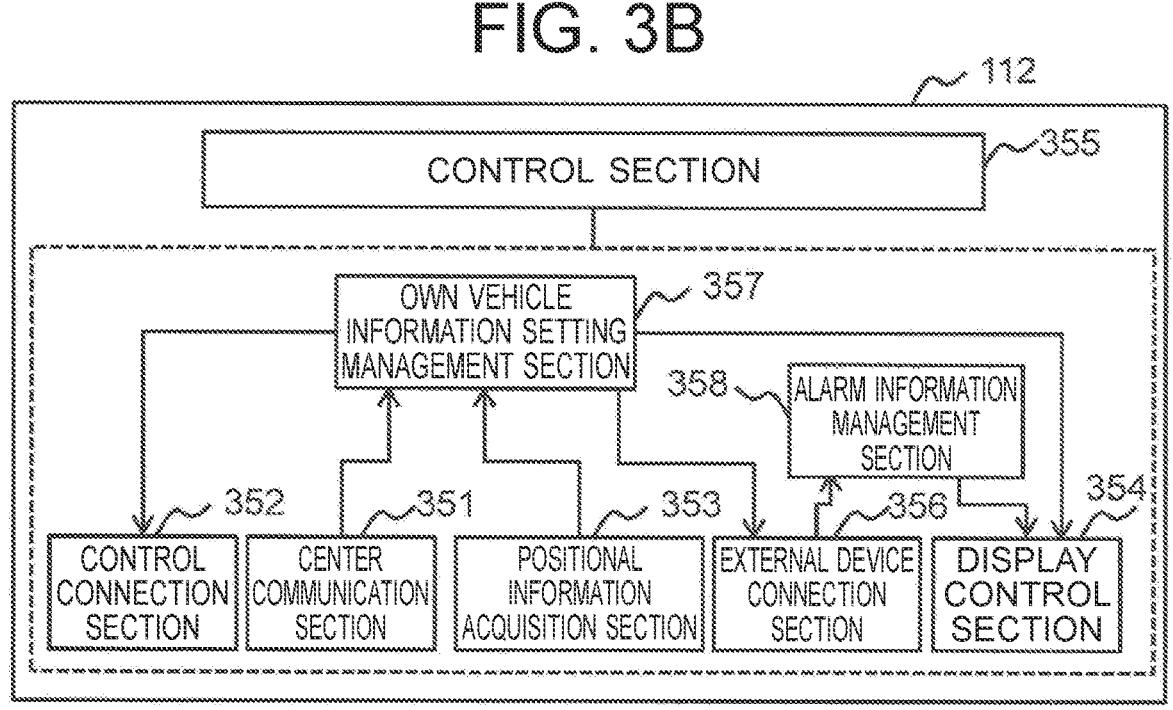
FIG. 3B is a functional block diagram of a fleet management terminal of an embodiment of the present invention.

Next, the function of the fleet management terminal 112 will be explained. The fleet management terminal 112 of the present embodiment has a function basically similar to that of an operation management terminal of an operation management system of a prior art such as a terminal used in FMS (Fleet Management System) for example. That is to say, as shown in FIG. 3B, a center communication section 351, a control connection section 352, a positional information acquisition section 353, a display control section 354, a control section 355, an external device connection section 356, an own vehicle information setting management section 357, and an alarm information management section 358 are included.

The center communication section 351 transmits and receives data to and from the fleet management center 140 through the center communication antenna 312. For example, the center communication section 351 acquires the current operation state of the own vehicle from the control section 355, and notifies the fleet management center 140 of the same. Also, the center communication section 351 receives the operation instruction with respect to the vehicle in question from the fleet management center 140, and notifies the control section 355 of the same. Further, when setting for every vehicle is consolidated by the fleet management center 140, the center communication section 351 receives setting for the vehicle in question from the fleet management center 140, and notifies the control section 355 of the same. As the wireless communication method, the infrastructure mode of WiFi, the cellular phone network, the mesh network such as 802.11n can be also used.

The control connection section 352 transmits and receives data to and from the vehicle control system 114. The control connection section 352 receives a control signal from the vehicle control system 114, and transmits the same to the control section 355. Out of the control signals received, the control signal that is common irrespective of the vehicle type includes the accelerator opening, steering angle, brake signal, shift lever position, and the like. The control signal that is different according to the vehicle type includes the revolving angle, revolving speed, and the like of an arm when the vehicle type is an excavator for example.

The positional information acquisition section 353 calculates the positional information and the traveling information of the own vehicle using the GNSS signal received by the GNSS receiver 304 through the GNSS antenna 313, and transmits the same to the own vehicle information setting management section 357 and the control section 355. Further, when the safe operation assistance device 200 also has the function of receiving the GPS data, it may be configured to determine which positional information received by the positional information acquisition section 353 or positional information received by the safe operation assistance device 200 is to be used. The determination method is as described above.

The display control section 354 outputs image data to the operator user interface 113.

The own vehicle information setting management section 357 manages the own vehicle information. The own vehicle information managed is the unique information, the operation information, and the like of the own vehicle for example. Also, the own vehicle information setting management section 357 of the present embodiment generates the setting data and the operation data described above responding to a request from the safe operation assistance device 200, and transmits the same to the source of the request through the external device connection section 356.

As described above, the external device connection section 356 transmits and receives data to and from the safe operation assistance device 200. In the present embodiment, the setting data and the operation data received from the own vehicle information setting management section 357 are transmitted to the safe operation assistance device 200. Also, when alarm data are received from the safe operation assistance device 200, the external device connection section 356 transmits the alarm data to the alarm information management section 358.

When the alarm data are received through the external device connection section 356, the alarm information management section 358 generates screen data according to the alarm data received. Also, the alarm information management section 358 makes the display control section 354 output the screen data to the operator user interface 113.

The control section 355 controls each section within the fleet management terminal 112. For example, the control section 355 generates a control signal outputted to the vehicle control system 114 and image data outputted from the display control section 354. The control signal and the image data are formed according to the data received from the fleet management center 140 and/or the vehicle control system 114 and the current condition of the own vehicle kept by the own vehicle information setting management section 357.

Data Format

Next, the data which the safe operation assistance device 200 transmits and receives to and from other devices will be explained using a communication format of the data.

Figure 4A:
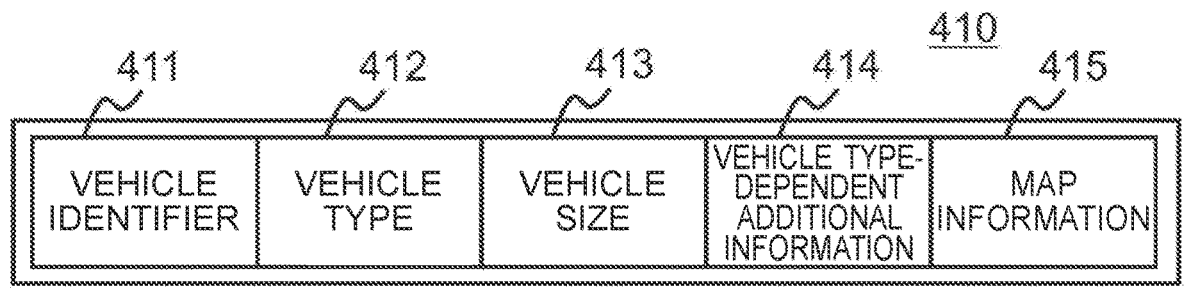
FIG. 4A to FIG. 4D are an explanatory drawing for explaining a communication format of the data transmitted and received between devices of an embodiment of the present invention.

FIG. 4A is an example of the communication format of the setting data 410 received by the safe operation assistance device 200 from the fleet management terminal 112 through the inter-other device connection section 256. As shown in the present drawing, the setting data 410 includes information unique to a vehicle (unique information) including a vehicle identifier 411, a vehicle type 412, a vehicle size 413, and vehicle type-dependent additional information 414, and information not changing with time such as map information 415. Such information is used at the time of initial setting of the safe operation assistance device 200. When the safe operation assistance device 200 is started and connection with the fleet management terminal 112 is established, these setting data 410 are requested to and received from the fleet management terminal 112 through the inter-other device connection section 256.

The vehicle identifier 411 is an identifier given uniquely to each vehicle that is managed by the fleet management center 140. Thereby, the fleet management center 140 uniquely identifies each vehicle that is managed within a mine. For the vehicle identifier 411, an identifier is set which is given to a vehicle (own vehicle) mounting the fleet management terminal 112 that is the connecting destination device.

The vehicle type 412 is an identifier identifying the type of a vehicle. Information depending on the type of the own vehicle such as a dump truck and an excavator, a wheel loader, a grader, a dozer, a drill, a light vehicle, and the like for example is set.

The vehicle size 413 is the size of the own vehicle, and is the width and length of the vehicle for example. Values depending on the size of the own vehicle are set.

The vehicle type-dependent additional information 414 is information additionally required depending on the vehicle type. For example, when the vehicle type 412 is an excavator, the length of the arm and the like are set according to the necessity.

The map information 415 is map information used in the fleet management terminal 112 of the own vehicle. For example, information of a node showing the point row for expressing a road shape, a link showing a chain of the point row, an area for showing a plane like a loading site and a dumping site, and so on are set.

Figure 4B:
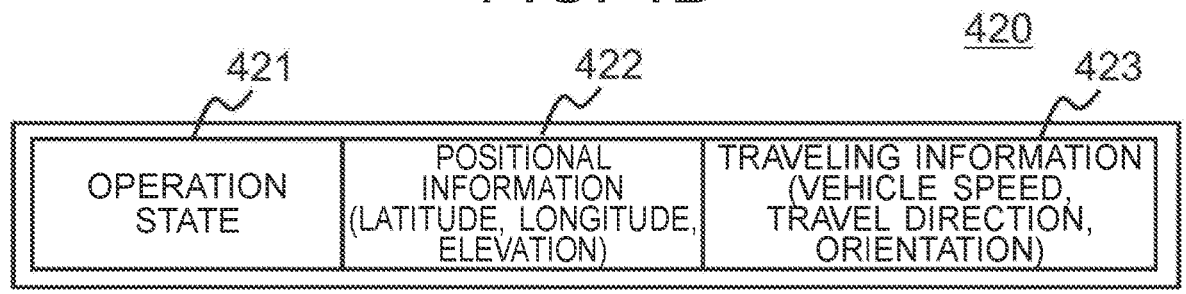

FIG. 4B is an example of the communication format of operation data 420 received by the safe operation assistance device 200 from the fleet management terminal 112 through the inter-other device connection section 256. As shown in the present drawing, the operation data 420 includes an operation state 421, positional information 422 such as the latitude, longitude, elevation, and the like, and traveling information 423 such as the vehicle speed, travel direction, vehicle body orientation, and the like. The operation data 420 are regularly outputted from the fleet management terminal 112 to the safe operation assistance device 200.

Also, when the safe operation assistance device 200 includes the GNSS antenna 213 and can receive the GNSS data, information that can be acquired from the GNSS data such as the positional information, speed, and travel direction out of the operation data 420 is not required to be received from the fleet management terminal 112. Otherwise, the information may be used only for determination of the connection state as described above.

The operation state 421 is information showing the operation state (operation management state) of the own vehicle as described above. Also, when the fleet management terminal 112 has a function of determining the working mode of a vehicle, information of the working mode showing the work under execution by the own vehicle may be included in the operation state 421.

Further, when an excavator and a wheel loader as an object vehicle of the loading work exist, a vehicle identifier corresponding to the object vehicle may be included in the operation state 421. Also, the route information and the like at the time of haulage also may be included. Further, when the vehicle type 412 is an excavator or a wheel loader, information showing the operating status such as "operating" and "not operating" may be included. When a dump truck as the object vehicle that is the loading destination of the mineral and the like exists, a vehicle identifier and the like corresponding to the object vehicle may be included. Such information is used for executing determination taking the difference in the vehicle type, the difference in the vehicle type of the counterpart vehicle, the difference in the risk caused by the difference in the location into consideration at the time of the risk determination.

The positional information 422 is information showing the position of the own vehicle such as the latitude, longitude, and elevation. With respect to the latitude, longitude, and elevation, data acquired in the positional information acquisition section 353 described below of the fleet management terminal 112 for example are set. Also, the positional information 422 only has to be capable of capturing the position of a vehicle, and may be, for example, the relative distance from a reference point which is arranged within a mine.

The traveling information 423 includes information and the like of the vehicle speed, travel direction, and vehicle body orientation. Among them, a vehicle speed is the speed of the own vehicle. The vehicle speed acquired in the positional information acquisition section 353 of the fleet management terminal 112, the speed received from the vehicle control system 114, and so on are set. Also, the travel direction is the direction of the velocity vector of the own vehicle. Information received from the positional information acquisition section 353 or the vehicle control system 114 is registered. The vehicle body orientation is information showing the orientation of the vehicle. For example, a value the same as that of the travel direction is set at the time of going forward, and a value different by 180 degrees from that of the travel direction is set at the time of going backward.

Figure 4C:
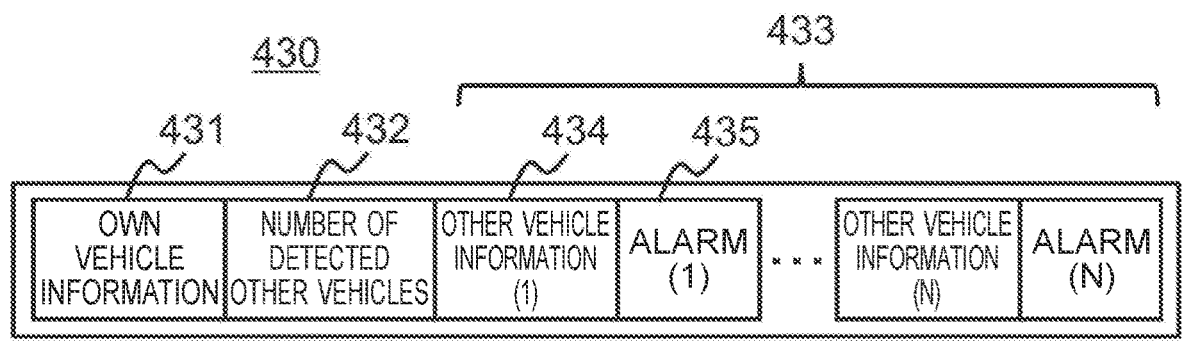

Next, alarm data transmitted from the safe operation assistance device 200 to the connecting destination device through the inter-other device connection section 256 will be explained. FIG. 4C is an example of the communication format of alarm data 430 of the present embodiment. The alarm data are data based on output data which is obtained by that the risk determination section 254 executes risk determination and the output data generating section 258 generates using the result of the risk determination.

As shown in the present drawing, the alarm data 430 includes own vehicle information 431, the number of detected other vehicles 432, and alarm information 433.

The own vehicle information 431 is information of the own vehicle of the transmission source, and the number of detected other vehicles 432 is the number of the other vehicles having been determined this time. In the alarm information 433, for each other vehicle having been determined, information (other vehicle information) 434 of the other vehicle in question and, when it is determined that there is a collision risk, information (alarm) 435 that means that effect are stored. With respect to other vehicles having been determined to have no collision risk, only the other vehicle information 434 is stored.

Figure 4D:
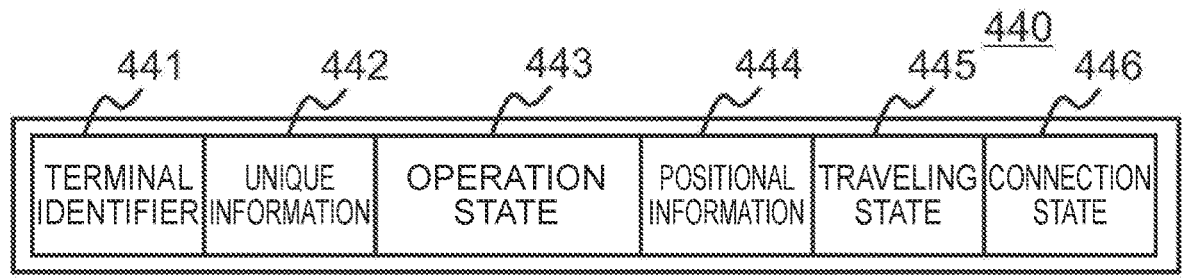

Next, inter-vehicle communication information will be explained which is transmitted and received through inter-vehicle communication between respective safe operation assistance devices 200. FIG. 4D is an example of the communication format of the inter-vehicle communication information of the present embodiment.

As shown in the present drawing, inter-vehicle communication information 440 includes a terminal identifier 441, unique information 442, an operation state 443, positional information 444, traveling information 445, and a connection state 446 for example. As described above, such information is acquired from the own vehicle information management table 520. Also, it is not necessarily required to include all of the information. For example, it may be configured to transmit and receive only information required for the algorithm of the risk determination described below.

Next, own vehicle information managed by the own vehicle information management section 252 in the own vehicle information management table 520 will be explained. An example of the own vehicle information is shown in FIG. 5A.

As shown in the present drawing, the own vehicle information includes a terminal identifier, unique information, positional information, traveling information, an operation state (OP state), time of receipt, and a connection state.

The terminal identifier is an identifier that uniquely identifies the safe operation assistance device 200, and is a value that does not duplicate with other safe operation assistance devices 200. The terminal identifier is set in each safe operation assistance device 200 beforehand. For example, a MAC address and the like of the inter-vehicle communication interface 209 are used.

The unique information is information unique to the own vehicle as described above, is a vehicle identifier, a vehicle type, a vehicle size, additional information, and the like for example, and is received from the unique information setting section 251 and set at the time of the startup. As described above, when the connecting destination device is the fleet management terminal 112, respective values within the setting data 410 received from the fleet management terminal 112 are set. Also, when the connecting destination device is the operator user interface 133 or solely used, the default value set by the unique information setting section 251 is set.

The positional information is information of the present position of the own vehicle, and includes the latitude, longitude, and elevation for example. Also, the traveling information is information identifying the traveling state of the own vehicle, and includes the speed, travel direction, orientation, and the like for example. The positional information and the traveling information are acquired from the positional information acquisition section 257, or are acquired from the operation data 420 having been received from the fleet management terminal 112.

The operation state is information identifying the working state of the own vehicle. The operation state is acquired from the operation data 420 having been received from the fleet management terminal 112 for example. Also, in the case the connecting destination device is the operator user interface 133 or in the case of being solely used, the operation data 420 cannot be acquired from the fleet management terminal 112. In such case, a blank value is stored which shows that operation management has not been executed.

The time of receipt is the latest date and time at which the data acquired regularly have been acquired. For example, when the positional information and the traveling information are received from the positional information acquisition section 257 and the working information is received from the connecting destination detecting section 259, it may be configured to store the latest time of the both. Otherwise, it is also possible to store the latest time of either one.

The connection state is information showing the connection state of the safe operation assistance device 200. The detection result by the connecting destination detecting section 259 described above is stored.

Next, other vehicle information stored in the other vehicle information management table 530 will be explained. An example of the data of the other vehicle information is shown in FIG. 5B. As described above, the inter-vehicle communication information received through the inter-vehicle communication section 255 is stored for each of the vehicle identifiers within the unique information or each of the terminal identifiers. The stored items are basically the same as those of the own vehicle information. However, for the time of receipt, the time at which the inter-vehicle communication information 440 is received is stored. This time of receipt is used for determination of whether or not the record is to be deleted.

Process Flow

Next, the operation of the safe operation assistance device 200 of the present embodiment by respective functions described above will be explained. As described above, in all vehicles operated in a mine and the like, only by connecting the safe operation assistance device 200 of the present embodiment to a device that is mounted on an on-board system of a vehicle, information such as the vehicle type is set initially without setting operation by an operator, and the collision risk depending on the vehicle type is determined. Also, the safe operation assistance device 200 of the present embodiment is operated even under a stand-alone condition. Further, even when connection with the connecting destination device has been interrupted, the collision risk can be determined continuously.

Figure 6:
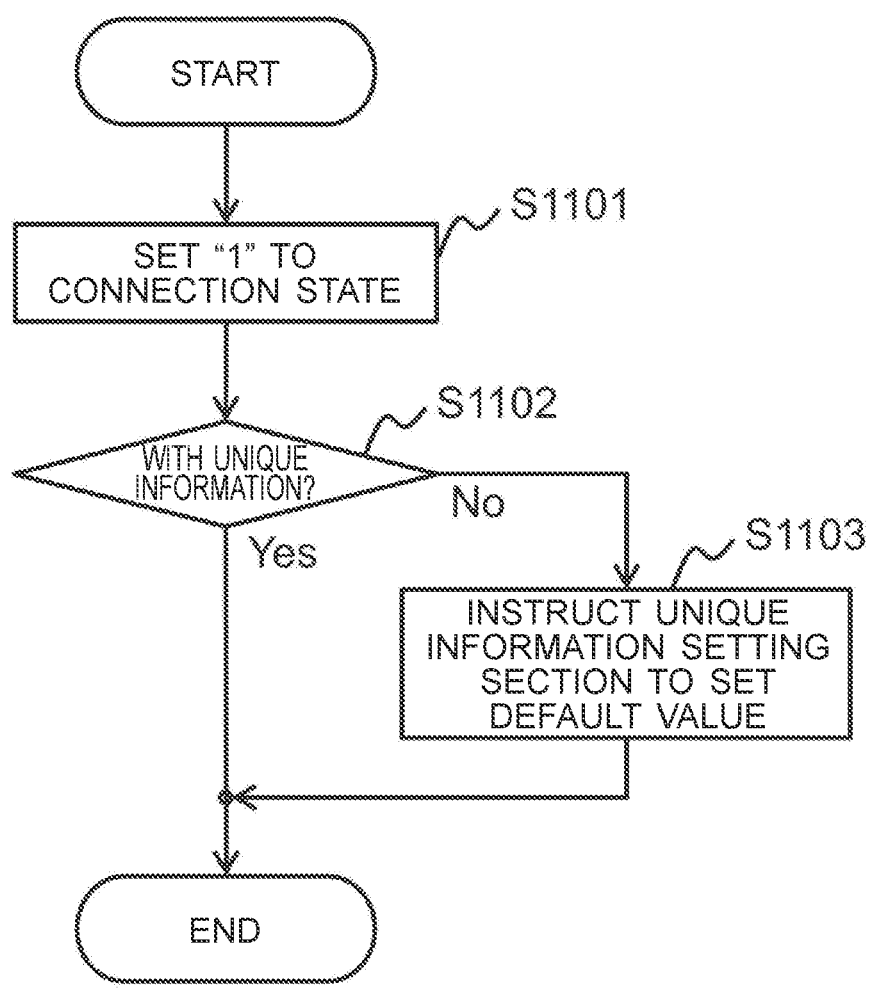
FIG. 6 is a flowchart of a process at the time of startup of an embodiment of the present invention.

First, the process flow at the time of the startup will be explained. FIG. 6 is a process flow at the time of the start-up of the safe operation assistance device 200 of the present embodiment. At the time of the start-up, the safe operation assistance device 200 initializes the connection state. Initialization of the connection state means to set the connection state to "1: waiting for connection".

When the safe operation assistance device 200 is started, the connecting destination detecting section 259 issues an instruction to the own vehicle information management section 252 to make the connection state of the own vehicle information management table 520 "1: waiting for connection" (step S1101).

Next, the connecting destination detecting section 259 gets access to the unique information setting section 251, and determines whether or not the information of the time of the previous start-up has been kept (step S1102).

When the information of the time of the previous start-up has not been kept in the step S1102, the connecting destination detecting section 259 instructs the unique information setting section 251 to set the default value as the unique information (step S1103), and the process is finished.

Figure 7:
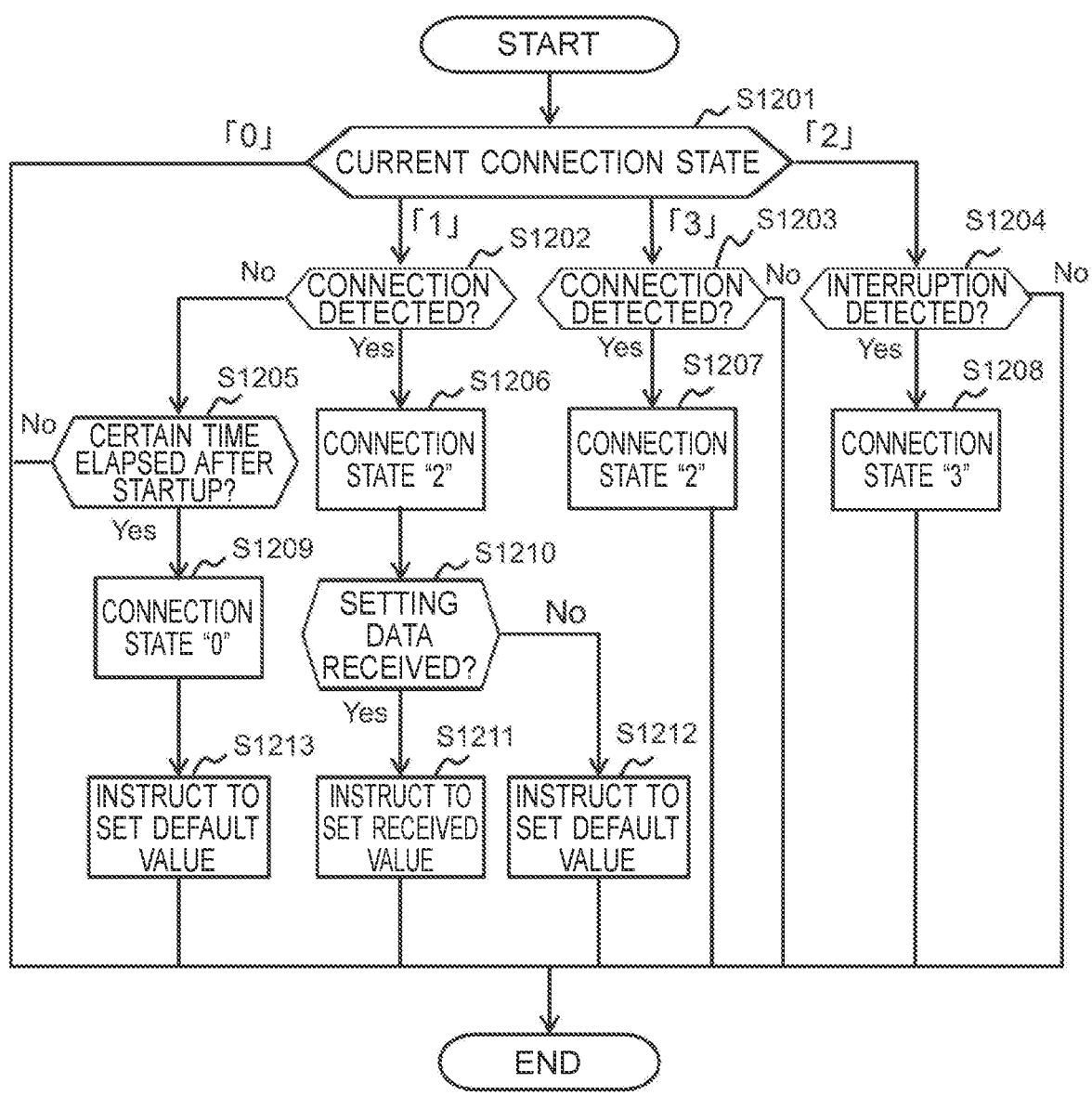
FIG. 7 is a flowchart of a connection state confirmation updating process of an embodiment of the present invention.

Next, a flow of the connection state confirmation updating process by the connecting destination detecting section 259 of the safe operation assistance device 200 after finishing the process of the time of the startup described above will be explained. As described above, the connecting destination detecting section 259 of the present embodiment monitors the connection state at a predetermined time interval (periodically) after the start-up. Also, at the time of the initializing process, the connecting destination detecting section 259 detects the connecting destination device, and notifies the unique information setting section 251 of the connecting destination device. FIG. 7 is a process flow of the connection state confirmation updating process by the connecting destination detecting section 259.

First, the connecting destination detecting section 259 determines the current connection state (step S1201). Determination is executed by information having been registered to the connection state of the own vehicle information management table 520.

In the case of "0: not yet connected", the process is finished as it is.

In the case of "1: waiting for connection", as an initial process after the startup, the connecting destination is detected, and the unique information is set. Here, first, presence or absence of the connection detection is determined (step S1202). Determination is executed by whether or not the connection notification from the inter-other device connection section 256 has been received.

When the connection is not detected in the step S1202, whether a certain time has elapsed after this start-up of the safe operation assistance device 200 is confirmed (step S1205). The present process is arranged for absorbing the difference of the start-up time among respective devices, and an appropriate value is set beforehand for the time used for determination.

When a certain time has not elapsed, the present periodical process is finished. The safe operation assistance device 200 may be hereinafter possibly connected, and the present process is for waiting for the connection notification continuously.

Meanwhile, when a certain time has elapsed, the own vehicle information management section 252 is instructed to set "0: not yet connected" to the connection state of the own vehicle information management table 520 (step S1209). When an external device is not connected even when a certain time has elapsed after the start-up, it is determined that a device such as the fleet management terminal 112 and the operator user interface (tablet) 133 will not be newly connected from now on, and this connection state is set. That is to say, the connecting destination detecting section 259 determines that the safe operation assistance device 200 is used solely.

Also, the connecting destination detecting section 259 instructs the unique information setting section 251 to set the default value as the unique information (step S1213), and the present periodical process is finished. Thereby, the present safe operation assistance device 200 is not connected to an external device, and is operated in an independent state. Also, the unique information setting section 251 keeps the default value as the unique information, and transmits the default value to the own vehicle information management section 252 as the unique information. Upon receipt of the default value, the own vehicle information management section 252 sets the default value to the unique information of the own vehicle information management table 520.

Also, when a connection has been detected in the step S1202, first, the connecting destination detecting section 259 sets "2: connection established" to the connection state of the own vehicle information management table 520 (step S1206). Next, it is determined whether or not the setting data 410 have been received from the inter-other device connection section 256 (step S1210).

Also, when the setting data 410 have been received, the setting data 410 in question are transmitted to the unique information setting section 251, it is instructed to set the setting data 410 as the unique information (step S1211), and the present periodical process is finished.

In this case, the connecting destination detecting section 259 determines that the safe operation assistance device 200 has been connected to the fleet management terminal 112, and executes instruction so as to set the setting data 410 having been transmitted from the fleet management terminal 112 as the unique information. Further, the unique information setting section 251 having received the setting data 410 keeps the setting data 410 by itself, and also transmits the setting data 410 to the own vehicle information management section 252. Also, the own vehicle information management section 252 sets a value within the setting data 410 to the unique information of the own vehicle information management table 520. At this time, when the unique information has been already kept, the unique information setting section 251 updates the unique information to newly received unique information.

Meanwhile, when the setting data 410 have not been received in the step S1210, the unique information setting section 251 is instructed to set the default value as the unique information (step S1212), and the present periodical process is finished.

In this case, the connecting destination detecting section 259 determines that the safe operation assistance device 200 has been connected to an external device but has not been connected to the fleet management terminal 112. Therefore, it is determined that the safe operation assistance device 200 has been connected to the operator user interface 133 that is mounted on a general vehicle, and instruction of setting the default value as the unique information is executed. The unique information setting section 251 keeps the unique information by itself, and transmits the unique information to the own vehicle information management section 252. Also, the own vehicle information management section 252 sets the default value to the unique information of the own vehicle information management table 520.

Further, when the connection state is "3: interrupted after connection" in the step S1201, first, the connecting destination detecting section 259 determines presence or absence of detection of connection (step S1203). Determination is executed by a method similar to that of the step S1202 described above. Here, when connection is not detected, it is assumed that the interrupted state is continuing, and the present periodical process is finished.

Meanwhile, when connection has been detected in the step S1203, the connecting destination detecting section 259 sets "2: connection established" to the connection state of the own vehicle information management table 520 (step S1207), and the present periodical process is finished. Also, at this time, resetting of the unique information by the unique information setting section 251 is not executed. The reason is that such situation is assumed to be a case of being interrupted apparently by the noise, a case that physical connection is interrupted for a moment affected by vibration, and so on for example.

Also, when it is determined to be "2: connection established" in the step S1201, the connecting destination detecting section 259 sets "3: interrupted after connection" to "connection state" of the own vehicle information management table 520 only when interruption has been detected.

In concrete terms, first, whether or not interruption has been detected is determined (step S1204). When an interruption notification has been received from the inter-other device connection section 256, the connecting destination detecting section 259 determines that interruption has been detected.

When interruption is not detected in the step S1204, the present periodical process is finished. Meanwhile, when interruption is detected, "3: interrupted after connection" is set to the connection state of the own vehicle information management table 520 (step S1208), and the process is finished.

By periodically executing the process described above, the connecting destination detecting section 259 sets the unique information of a vehicle on which the safe operation assistance device 200 is mounted to the unique information setting section 251, and maintains the connection state information of the own vehicle information management table 520 at the latest state.

Risk Determination Process

Figure 8:
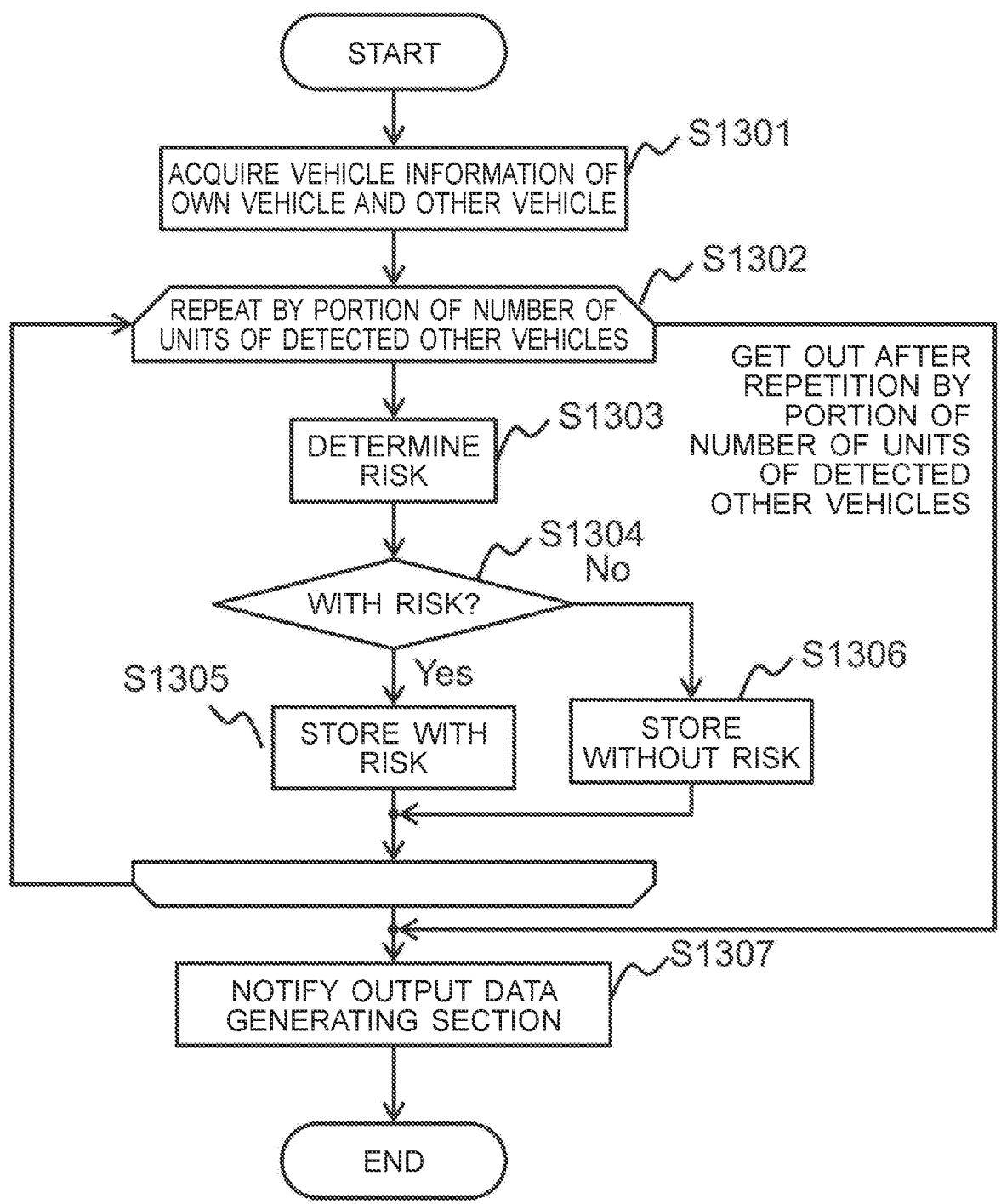
FIG. 8 is a flowchart of a risk determining process of an embodiment of the present invention.

Next, the risk determination process by the risk determination section 254 will be explained. FIG. 8 is a process flow of the risk determining process of the present embodiment. The risk determining process is executed regularly at a certain time interval, or at the time a specific event occurs, and so on for example as described above.

The risk determination section 254 acquires information of the own vehicle from the own vehicle information management table 520 and information of the other vehicles from the other vehicle information management table 530, respectively (step S1301).

The risk determination section 254 determines the collision risk with respect to each of the other vehicles stored in the other vehicle information management table 530. In concrete terms, with respect to the portion of the number of units of the other vehicles having been detected namely with respect to all records having been stored in the other vehicle information management table 530, the process described below is executed in order (step S1302).

Risk determination is executed using the positional information of the own vehicle and the positional information of the other vehicle, the other vehicle being an object of processing (step S1303). As described above, the risk is determined using the vehicle type, the operation state, and the like in addition to the positional information and according to the algorithm that depends on combination with such information of the own vehicle.

When it is determined that there is a risk, the risk determination section 254 stores "with risk" to the determination result management table 540 associating with the vehicle identifier for example of the other vehicle information of the processing object (step S1305).

Meanwhile, when it is determined that there is no risk, the risk determination section 254 stores "without risk" to the determination result management table 540 associating with the vehicle identifier for example of the other vehicle information of the processing object (step S1306). Also, it may be configured that, when it is determined that there is no risk, the vehicle in question is not stored in the determination result management table 540.

When the process described above has been executed for all of the other vehicles, the risk determination section 254 notifies the output data generating section 258 of the effect that the risk determination process has finished (step S1307), and finishes the risk determination process.

As explained above, the risk determination section 254 of the present embodiment determines the risk based on the collected information. Also, in the risk determination process described above, explanation was made exemplifying a case of executing detailed risk determination based on various kinds of parameters such as the vehicle type and the working state of the vehicle. However, the risk determination process is not limited to the present method. For example, the risk may be determined only by the distance between the vehicles. For example, when the distance to the other vehicle has become a predetermined value or less, it is determined that there is a risk, and so on.

Figure 9:
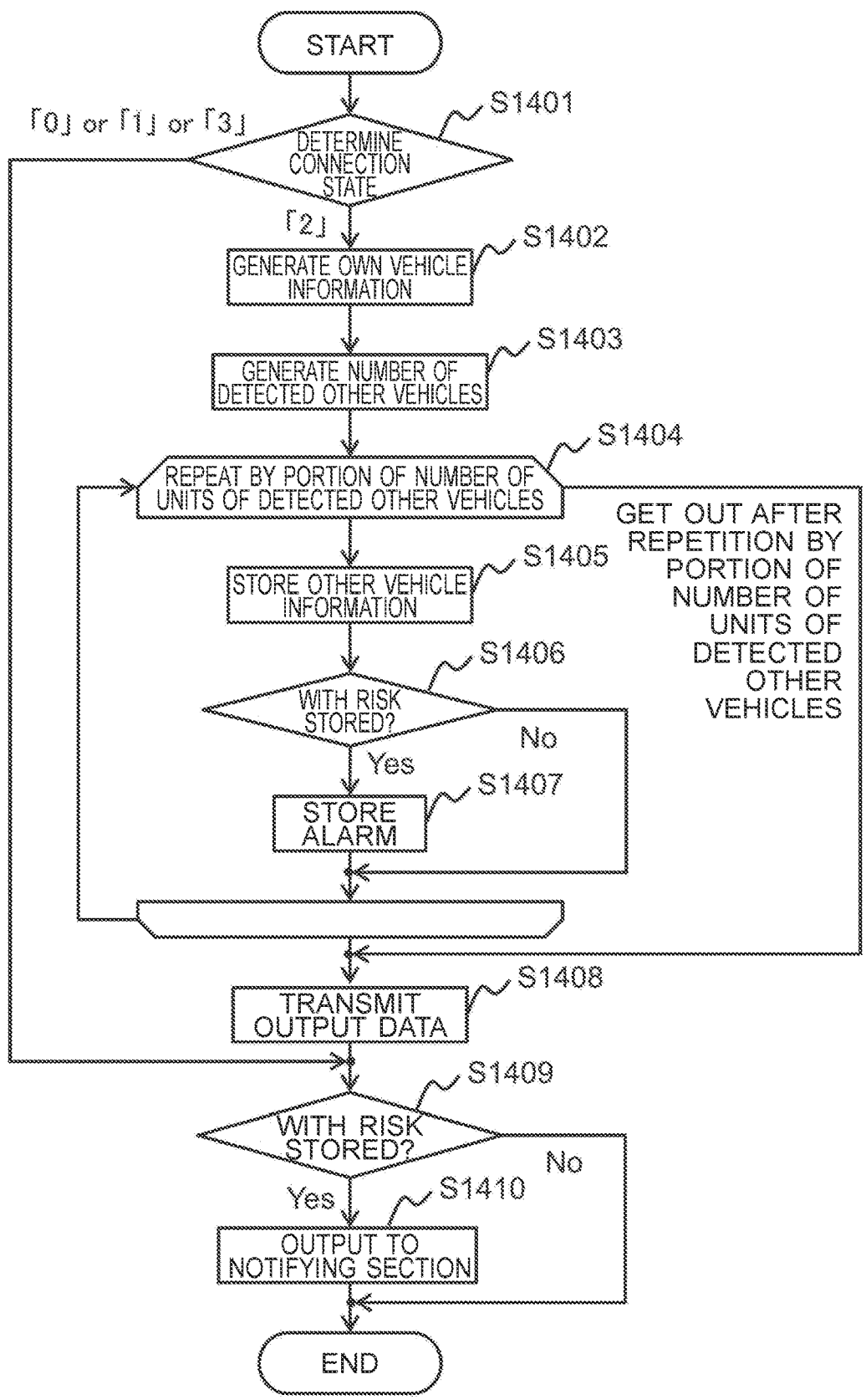
FIG. 9 is a flowchart of an output data generating process of an embodiment of the present invention.

Next, a flow of the output data generating process by the output data generating section 258 having received a notification of finish of the risk determination process from the risk determination section 254 will be explained. Explanation will be made exemplifying a case of generating the output data becoming sources of the alarm data 430 shown in FIG. 4C. FIG. 9 is a process flow of the output data generating process of the present embodiment.

First, the output data generating section 258 determines the connection state of the own vehicle (step S1401). Here, the output data generating section 258 gets access to the own vehicle information management table 520, and determines the connection state of the own vehicle by the data stored in the connection state. Also, when the stored data are "2: connection established", the process described below is executed, and the output data are formed.

First, the output data generating section 258 acquires the own vehicle information from the own vehicle information management table 520, and generates "the own vehicle information 431" (step S1402). Also, here, it is not required to acquire all of the own vehicle information. At least the positional information, the traveling information, and the vehicle identifier only have to be included.

Next, the output data generating section 258 gets access to the other vehicle information management table 530, acquires the number of the other vehicles having been stored, and generates "the number of detected other vehicles 432" (step S1403).

Thereafter, the output data generating section 258 executes the process described below with respect to the portion of the number of units of the other vehicles having been detected namely with respect to all records having been stored in the other vehicle information management table 530 (step S1404).

First, the output data generating section 258 acquires the other vehicle information, and generates "the other vehicle information 434" (step S1405). Then, the output data generating section 258 gets access to the determination result management table 540, and determines whether or not "with risk" has been stored for the vehicle in question (step S1406). Also, when "with risk" has been stored, the output data generating section 258 generates "the alarm 435" (step S1407). Further, it is not required to acquire all of the other vehicle information in the step S1405 also. At least the positional information, the traveling information, and the vehicle identifier only have to be included.

When the process described above has been finished and the output data have been completed with respect to all of the other vehicles, the output data generating section 258 transmits the output data having been formed to the inter-other device connection section 256 (step S1408). The inter-other device connection section 256 having received the output data generates the alarm data 430, and transmits the alarm data 430 to the connecting destination device.

Thereafter, when there is other vehicle having been determined to have the risk in the risk determination, the output data generating section 258 generates an instruction that is announced from the notifying section 260. In concrete terms, first, the output data generating section 258 determines whether or not there are the data having been stored so as to be "with risk" in the determination result management table 540 (step S1409). Also, when there are the data in question, the output data generating section 258 generates notifying data, outputs the notifying data to the notifying section 260 (step S1410), and finishes the process.

Further, in the present embodiment, explanation was made exemplifying a case the risk determination section 254 and the output data generating section 258 were provided independently and risk determination and output data formation were executed separately from each other. However, it may be configured to execute risk determination and output data formation simultaneously.

That is to say, with respect to each of the other vehicles, the risk is determined and the output data are formed whenever the determination result is stored in the determination result management table 540. Also, instruction is executed to the notifying section 260 to effect announcement only when there is a vehicle type that is determined to have a risk for the last time.

Further, although the output data generating section 258 generates the output data even when there is no other vehicle having been determined to have a risk, the present embodiment is not limited to the present process. For example, it may be also configured to generate the output data only when there is the other vehicle having been determined to have a risk.

As described above, in the present embodiment, risk determination for a collision is executed in the safe operation assistance device 200 that is independent from the fleet management terminal 112. Therefore, even a general vehicle that does not mount the operation management system communicable with the fleet management center can execute assistance of safe driving at the working site.

Also, the safe operation assistance device 200 of the present embodiment includes the connecting destination detecting section 259 detecting the connecting destination device of itself, and the unique information setting section 251 setting the unique information of the own vehicle that is the vehicle of the mounting destination of itself depending on the detected connecting destination device. Further, the unique information setting section 251 sets the information having been transmitted from the fleet management terminal 112 to the unique information when the connecting destination detecting section 259 has detected the fleet management terminal 112 to be the connecting destination device, and the unique information setting section 251 sets a predetermined value as the unique information in the case other than the above.

Therefore, in the safe operation assistance device 200 of the present embodiment, since the information unique to a vehicle can be used for risk determination, risk determination depending on the difference of the vehicle type and depending on the working content can be executed, and a necessary and sufficient alarm can be given to an operator.

Also, at a working site of a mine and the like, vehicles under control of the operation management system and vehicles not under control are mixed. Therefore, in a safe operation assistance device of a prior art, when a common device was to be used, it was necessary to manually set information unique to each vehicle with respect to all vehicles. Meanwhile, when only a vehicle under control used information from an operation management system, it was necessary to prepare different systems for vehicles under control and vehicles not under control.

However, according to the safe operation assistance device 200 of the present embodiment, with respect to vehicles under control of the operation management system, the same system is utilized and unique information is automatically set, and a predetermined value is automatically set as unique information as general vehicles with respect to vehicles not under control. Therefore, since appropriate unique information is automatically set irrespective of the vehicle type, identical devices can be used for the both. Also, by connecting the safe operation assistance device 200 of the present embodiment afterwards, the fleet management terminal 112 can secure a collision prevention effect without executing special setting.

Also, according to the present embodiment, since unique information is automatically set to all of the safe operation assistance devices 200, individual setting is not required at the time of connection. Therefore, erroneous operation caused by erroneous setting does not occur. Further, this unique information is kept in a non-volatile storage such as a FLASH memory. Therefore, the unique information is maintained even when connection with the fleet management terminal 112 is disconnected, and even when the safe operation assistance device 200 is powered off. Accordingly, even in a case of usage under an environment that connection is likely to be disconnected and under an environment that a mounted device is likely to break down such as a mine, time and effort are not taken at the time of re-connection. Further, safe driving assistance can be continuously executed.

Also, the safe operation assistance device 200 of the present embodiment further includes the positional information acquisition section 257 that acquires the positional information of the own vehicle. Further, the positional information of the surrounding other vehicle is acquired by inter-vehicle communication. Therefore, risk determination is allowed even for vehicles not mounting the fleet management terminal 112, and risk determination is allowed even under such environment not communicable with the fleet management center 140. Accordingly, safe driving can be assisted irrespective of the vehicle type and the vehicle and irrespective of the working environment.

Thus, according to the safe operation assistance device 200 of the present embodiment, identical devices can be used for vehicles becoming objects of control by the operation management system and vehicles that are not the objects. Therefore, it is not required to prepare safe operation assistance devices 200 having different configuration depending on the vehicle type, management of the stock of the device becomes easy, and the cost can be reduced by the unified specification. That is to say, the safe operation assistance device 200 of the present embodiment is user-friendly and effectively can reduce collisions irrespective of the environment and the vehicle type.

Also, the present invention is not limited to the embodiments described above, and includes various modifications. For example, the embodiments described above have been explained in detail for easy understanding of the present invention, and are not necessarily limited to those provided with all configurations having been explained.

REFERENCE SIGNS LIST

100 . . . Safe operation assistance system
110 . . . Vehicle
111 . . . On-board operation management unit
112 . . . (First) fleet management terminal
113 . . . Operator user interface
114 . . . Vehicle control system
120 . . . Vehicle
121 . . . On-board operation management unit
122 . . . Second fleet management terminal
123 . . . Operator user interface
124 . . . Vehicle control system
130 . . . Vehicle
131 . . . On-board unit
133 . . . Operator user interface
140 . . . Fleet management center
200 . . . Safe operation assistance device
201 . . . CPU
202 . . . Memory
203 . . . Storage device
204 . . . GNSS receiver
205 . . . Output device controller
206 . . . Output device
208 . . . Inter-connection device interface
209 . . . Inter-vehicle communication interface
211 . . . Internal bus
212 . . . Inter-vehicle communication antenna
213 . . . GNSS antenna
251 . . . Unique information setting section
252 . . . Own vehicle information management section
253 . . . Other vehicle information management section
254 . . . Risk determination section
255 . . . Inter-vehicle communication section
256 . . . Inter-other device connection section
257 . . . Positional information acquisition section
258 . . . Output data generating section
259 . . . Connecting destination detecting section
260 . . . Notifying section
301 . . . CPU
302 . . . Memory
303 . . . Storage device
304 . . . GNSS receiver
305 . . . Display interface
307 . . . Control system interface
308 . . . Inter-connection device interface
309 . . . Center communication interface
311 . . . Internal bus
312 . . . Center communication antenna
313 . . . GNSS antenna
351 . . . Center communication section
352 . . . Control connection section
353 . . . Positional information acquisition section
354 . . . Display control section
355 . . . Control section
356 . . . External device connection section
357 . . . Own vehicle information setting management section
358 . . . Alarm information management section
410 . . . Setting data
411 . . . Vehicle identifier
412 . . . Vehicle type
413 . . . Vehicle size
414 . . . Vehicle type-dependent additional information
415 . . . Map information
420 . . . Operation data
421 . . . Operation state
422 . . . Positional information
423 . . . Traveling information
430 . . . Alarm data
431 . . . Own vehicle information
432 . . . Number of detected other vehicles
433 . . . Alarm information
434 . . . Other vehicle information
435 . . . Alarm
440 . . . Inter-vehicle communication information
441 . . . Terminal identifier
442 . . . Unique information
443 . . . Operation state
444 . . . Positional information
445 . . . Traveling information
446 . . . Connection state
520 . . . Own vehicle information management table
530 . . . Other vehicle information management table
540 . . . Determination result management table

The invention claimed is:

1. A safe operation assistance device mounted on a first vehicle, comprising:
a calculation device (CPU);
a storage device;
an inter-connection device interface that communicably connects the safe operation assistance device to a connecting destination device, the connecting destination device being one of a user interface mounted on the first vehicle and a fleet management terminal mounted on the first vehicle, the user interface receiving operation of an operator, the fleet management terminal transmitting and receiving operation information by communication with a fleet management center;

an inter-vehicle communication interface that communicates with a safe operation assistance device mounted on a second vehicle;

a Global Navigation Satellite System (GNSS) receiver; and an output device, wherein the storage device is configured to store programs, and the CPU executes the programs so as to:

detect a connection state between the safe operation assistance device and the connecting destination device that is connected to the inter-connection device interface;

manage the connection state detected;

set first unique information for identifying a first vehicle type of the first vehicle, according to the connection state and the connecting destination device, the first vehicle being a vehicle on which the safe operation assistance device is mounted;

store the first unique information set in the storage device;

acquire first positional information of the first vehicle based on GNSS signals received by the GNSS receiver;

store the first positional information acquired in the storage device;

manage first vehicle information including the first positional information of the first vehicle and the first unique information of the first vehicle;

transmit the first positional information of the first vehicle and the first unique information of the first vehicle to the second vehicle through the inter-vehicle communication interface;

acquire second vehicle information including second positional information of the second vehicle and second unique information of the second vehicle through the inter-vehicle communication interface;

determine whether a risk of collision exists between the first vehicle and the second vehicle using the first vehicle information and the second vehicle information; and output a determined result from the output device, wherein the first unique information to be set is acquired from a predetermined data source according to the connection state and the connecting destination device, wherein the connection state being detected is at least one of a waiting-for-connection state, a connection-established state, an interruption-after-connection state, and a not-yet-connected state, the waiting-for-connection state is a state of executing detection of the connecting destination device, the connection-established state is a state of detecting the connecting destination device and maintaining connection, the interruption-after-connection state is a state where the connecting destination device has been detected but connection has been interrupted, and the not-yet-connected state is a state where it is determined that there is no detected connecting destination device when the connecting destination device cannot be detected even if a certain time elapses after start-up and a state where detection of the connecting destination device is not executed.

2. The safe operation assistance device according to claim 1, wherein, when the fleet management terminal has been detected as the connecting destination device within a certain time after start-up, the fleet management terminal managing the first unique information of the first vehicle, the CPU is configured to make the connection state the connection-established state, and set information having been transmitted from the fleet management terminal as the unique information.

3. The safe operation assistance device according to claim 1, wherein, when the fleet management terminal is not detected as the connecting destination device even when a certain time has elapsed after startup, the fleet management terminal manages the first unique information of the first vehicle, and the CPU is configured to make the connection state the not-yet-connected state, and set a predetermined value as the unique information even when connection with the fleet management terminal has been detected after detection of the connection state.

4. The safe operation assistance device according to claim 1, wherein, when the first unique information has been set after the connection state has been managed as the connection-established state, the CPU is configured to maintain the first unique information having been set even when connection with the connecting destination device has been interrupted, and maintain the first unique information having been set initially without newly setting the first unique information even when connection with the connecting destination device has been interrupted but has been connected again.

5. The safe operation assistance device according to claim 1, wherein the first vehicle information includes a first working state of the first vehicle, the second vehicle information acquired through the inter-vehicle communication interface includes a second working state of the second vehicle, and the CPU is configured to determine whether the risk of collision exists based on the first and second positional information and the first and second working states.

6. A safe operation assistance system, comprising:

a fleet management center that manages operation of a first vehicle and a second vehicle;

a fleet management terminal that is mounted on the first vehicle; and safe operation assistance devices that are mounted on each of the first vehicle and the second vehicle, wherein each of the safe operation assistance devices includes:

a calculation device (CPU);

a storage device;

an inter-connection device interface that communicably connects the safe operation assistance device to a connecting destination device, the connecting destination device being one of a user interface mounted on the first vehicle and a fleet management terminal mounted on the first vehicle, the user interface receiving operation of an operator, the fleet management terminal transmitting and receiving operation information by communication with a fleet management center;

an inter-vehicle communication interface that communicates with a safe operation assistance device mounted on a second vehicle;

a Global Navigation Satellite System (GNSS) receiver; and an output device, wherein the storage device is configured to store programs, and the CPU executes the programs so as to:

detect the connecting destination device that is connected to the inter-connection device interface of the safe operation assistance device;

manage a connection state between the safe operation assistance device and the connecting destination device;

set first unique information for identifying a first vehicle type of a first vehicle, according to the connection state and the connecting destination device, the first vehicle being a vehicle of a mounting destination of the safe operation assistance device;

store the first unique information set in the storage device;

manage first vehicle information including first positional information of the first vehicle and the first unique information of the first vehicle;

transmit the first positional information of the first vehicle and the first unique information of the first vehicle to the second vehicle through the inter-vehicle communication interface; and acquire second vehicle information including second positional information of the second vehicle and second unique information of the second vehicle through the inter-vehicle communication interface;

determine whether a risk of collision exists between the first vehicle and the second vehicle using the first vehicle information and the second vehicle information; and output a determined result from the output device, wherein the first unique information to be set is acquired from a predetermined data source according to the connection state and the connecting destination device, wherein the connection state being detected is at least one of a waiting-for-connection state, a connection-established state, an interruption-after-connection state, and a not-yet-connected state, the waiting-for-connection state is a state of executing detection of the connecting destination device, the connection-established state is a state of detecting the connecting destination device and maintaining connection, the interruption-after-connection state is a state where the connecting destination device has been detected but connection has been interrupted, and the not-yet-connected state is a state where it is determined that there is no detected connecting destination device when the connecting destination device cannot be detected even if a certain time elapses after start-up and a state where detection of the connecting destination device is not executed.

* * * * *